(12) United States Patent
Barbarek

(10) Patent No.: US 7,974,961 B2
(45) Date of Patent: Jul. 5, 2011

(54) METHOD AND APPARATUS TO FACILITATE THE CREATING AND ALTERING OF INDEX OBJECTS ON TABLES

(75) Inventor: Wayne Joseph Barbarek, Chicago, IL (US)

(73) Assignee: Computer Associates Think, Inc., Islandia, NY (US)

( * ) Notice: Subject to any disclaimer, the term of this patent is extended or adjusted under 35 U.S.C. 154(b) by 425 days.

(21) Appl. No.: 12/031,750

(22) Filed: Feb. 15, 2008

(65) Prior Publication Data

US 2009/0210443 A1 Aug. 20, 2009

(51) Int. Cl.
*G06F 7/00* (2006.01)
*G06F 17/30* (2006.01)

(52) U.S. Cl. ......... 707/705; 707/736; 707/741; 707/756

(58) Field of Classification Search ............ 707/999.001
See application file for complete search history.

(56) References Cited

U.S. PATENT DOCUMENTS

| 5,675,769 | A | * | 10/1997 | Ruff et al. ..................... 711/173 |
| 6,125,370 | A | * | 9/2000 | Courter et al. ..................... 1/1 |
| 6,269,375 | B1 | * | 7/2001 | Ruddy et al. ..................... 1/1 |
| 6,330,653 | B1 | * | 12/2001 | Murray et al. ................. 711/173 |
| 2009/0100089 | A1 | * | 4/2009 | Eadon et al. ................... 707/102 |

OTHER PUBLICATIONS

Norton PartitionMagic 8.0, Users Guide, 2004.*

* cited by examiner

*Primary Examiner* — Jay A Morrison
(74) *Attorney, Agent, or Firm* — Michael J. Buchenhorner

(57) ABSTRACT

A method for facilitating creation and managing of partitioned table indices of a table object of a first partitioning type includes steps of: automatically looking up a table and its partitioning type definition; retrieving the table index and all indices defined for that table object, and their definitions; presenting to a user at least a portion of the table index in a single set of index alter screens; receiving from the user an alter request in the form of a screen option; performing validity checking on the screen option, based on the index type. If the screen option is not compatible with the index type, the method automatically overrides the screen option with one that is compatible, and issues a diagnostic message. If the screen option is valid for the index type, the user is notified about the changes that will be made and the effect of those changes. Data definition language statements are then generated consistent with the screen options.

20 Claims, 30 Drawing Sheets

```
ROPTALT ---------------- CA - Table Alter ---------------- 2007/04/20 10:16:10
COMMAND ===>                                                   SCROLL ===> PAGE Option       => A              Object  => T          Mode    => O ONLINE
Item Name    => NOIXYET       > Creator => PDWJB    > Where  => N
SSID: MB1A ------------------------------------------------------ BARWAC2    >
Table        => NOIXYET       > Creator  => PDWJB   > Comm/Lab => N
Database     => DBX             Editproc =>           Data Cap => NONE
Tablespace   => NOIXYET         Validproc =>          OBID     =>
Partitioning > NO  (TS Parts: 3) Audit   => NONE      Volatile => N
Table Type   => REGULAR         Restrict =>           CCSID    => EBCDIC
Row Size     => 27/-4,021       Forgn Key => N        Chk Const > N CMD ### PS COLUMN NAME      COLUMN TYPE      SIZE       N D FORDAT PK UK FK
___  1     COL1             CHAR             8          Y N MIXED
___  2     COL2             CHAR             8          Y N MIXED
___  3     COL3             CHAR             8          Y N MIXED
******************************* BOTTOM OF DATA ********************************
```

FIG. 1

```
ROPICRE --------------- CA - Index Create --------------- 2007/04/20 10:17:09
COMMAND ===>                                                    SCROLL ===> PAGE Option      => C            Object   => I          Mode        => O ONLINE
Item Name   => MYINDEX      ) Creator => PDWJB     ) Where      => N
SSID: MB1A ----------------------------------------------------------- BARWAC2
Index Name  => MYINDEX      ) Creator => PDWJB     ) Comment    => N
Table Name  => NOIXYET      ) Creator => PDWJB     ) Unique Rule => NO
Buffer Pool => BP0          Cluster  => NO         Close Dataset => YES
Partitioned => yes          GBP Cache => CHANGED   Defer Build   => NO
Piecesize   =>              Padded   => DEFAULT    Index Type    => 2
Copy        =>                                     Define        => YES
CMD SEQ# PS KEY-COLUMN-NAME  ORDER COLTYPE      SRCTYPE   SIZE           N
___  1      COL1             ASC   CHAR                   8              Y
___  2      COL2             ASC   CHAR                   8              Y
___  3      COL3             ASC   CHAR                   8              Y
xxxxxxxxxxxxxxxxxxxxxxxxxxxxx BOTTOM OF DATA xxxxxxxxxxxxxxxxxxxxxxxxxxxxx EXPLICIT/IMPLICIT--------------------+
CMD         VCAT      STOGROUP PRIQTY  SECQTY  ERASE  FRPAGE  %FR
___                   SYSDEFLT DEFAULT DEFAULT NO     0       10
xxxxxxxxxxxxxxxxxxxxxxxxxxxxx BOTTOM OF DATA xxxxxxxxxxxxxxxxxxxxxxxxxxxxx
```

FIG. 2

```
CREATE INDEX   PDWJB.NOIX ON PDWJB.NOIX ( CHAR1 ASC )
               PARTITIONED
               USING STOGROUP SYSDEFLT
               CLUSTER
               PARTITION BY RANGE (PARTITION 1 ENDING AT ( 'a' ) ,
                                   PARTITION 2 ENDING AT ( 'b' ) ,
                                   PARTITION 3 ENDING AT ( 'c' ) ) ;
```

FIG. 3

```
CREATE INDEX   PDWJB.NOIX ON PDWJB.NOIX ( CHAR1 ASC )
               PARTITIONED
               USING STOGROUP SYSDEFLT
               PARTITION BY RANGE (PARTITION 1 ENDING AT ( 'a' ) ,
                                   PARTITION 2 ENDING AT ( 'b' ) ,
                                   PARTITION 3 ENDING AT ( 'c' ) ) ;
```

FIG. 4

```
ROPICRE --------------- CA - Index Create ---------------- 2007/04/20 10:19:32
COMMAND ===>                                                     SCROLL ===> PAGE
RO192I Index attributes have been updated to be compatible with type of index.
Option     => C                      Object  => I         Mode  => 0 ONLINE
Item Name  => MYINDEX              > Creator => PDWJ8    > Where => N
SSID: M81A ---------------------------------------------------------- BARWAC2
Index Name   => MYINDEX            > Creator  => PDWJ8    > Comment     => N
Table Name   => NOIXYET            > Creator  => PDWJ8    > Unique Rule => NO
Buffer Pool  => BP0                  Cluster  => YES       Close Dataset => YES
Partitioned  => YES (TS Parts: 3)    GBP Cache => CHANGED   Defer Build  => NO
Piecesize    =>                      Padded   => DEFAULT    Index Type   => 2
Copy         =>                                              Define       => YES
CMD SEQ# PS KEY-COLUMN-NAME    ORDER COLTYPE       SRCTYPE    SIZE         N
___  1      COL1               ASC   CHAR                     8            Y
___  2      COL2               ASC   CHAR                     8            Y
___  3      COL3               ASC   CHAR                     8            Y
************************** BOTTOM OF DATA ***********************************
          EXPLICIT/IMPLICIT--------------------+
CMD PART VCAT       STOGROUP PRIQTY  SECQTY  ERASE  FRPAGE  %FR
___  1              SYSDEFLT DEFAULT DEFAULT NO     0       10
___  2              SYSDEFLT DEFAULT DEFAULT NO     0       10
___  3              SYSDEFLT DEFAULT DEFAULT NO     0       10
************************** BOTTOM OF DATA ***********************************
```

FIG. 5

```
ROPICRE --------------- CA - Index Create -       -------- 2007/04/20 10:32:21
COMMAND ===>                                                    SCROLL ===> PAGE Option      => C                Object  => I          Mode  => O ONLINE
Item Name   => MYINDEX          ) Creator => PDWJB    ) Where => N
SSID: M81A ---------------------------------------------------------- BARWAC2
Index Name  => MYINDEX          ) Creator => PDWJB    ) Comment     => N
Table Name  => NOIXYET          ) Creator => PDWJB    ) Unique Rule => NO
Buffer Pool => BP0              Cluster  => YES       Close Dataset => YES
Partitioned => YES (TS Parts: 3) GBP Cache => CHANGED Defer Build  => NO
Piecesize   =>                  Padded   => DEFAULT   Index Type   => p
Copy        =>                                        Define       => YES
CMD SEQ# PS KEY-COLUMN-NAME     ORDER COLTYPE     SRCTYPE   SIZE      N
___  1      COL1                ASC   CHAR                  8         Y
___  2      COL2                ASC   CHAR                  8         Y
___  3      COL3                ASC   CHAR                  8         Y
******************************* BOTTOM OF DATA ********************************
            EXPLICIT/IMPLICIT--------------------+
CMD PART VCAT       STOGROUP PRIQTY  SECQTY  ERASE  FRPAGE  %FR
___  1              SYSDEFLT DEFAULT DEFAULT NO       0      10
___  2              SYSDEFLT DEFAULT DEFAULT NO       0      10
___  3              SYSDEFLT DEFAULT DEFAULT NO       0      10
******************************* BOTTOM OF DATA ********************************
```

FIG. 6

```
ROPICRE --------------- CA - Index Create ---------------- 2007/04/20 10:33:18
COMMAND ===>                                                    SCROLL ===> PAGE
RO192I Index attributes have been updated to be compatible with type of index.
Option      => C                 Object   => I          Mode     => O ONLINE
Item Name   => MYINDEX          ) Creator => PDWJB     ) Where    => N
SSID: M81A ----------------------------------------------------------- BARWAC2
Index Name  => MYINDEX          ) Creator => PDWJB     ) Comment  => N
Table Name  => NOIXYET          ) Creator => PDWJB     ) Unique Rule => NO
Buffer Pool => BP0               Cluster  => NO         Close Dataset => YES
Partitioned => YES (TS Parts: 3) GBP Cache => CHANGED   Defer Build => NO
Piecesize   =>                   Padded   => DEFAULT    Index Type => P
Copy        =>                                          Define    => YES
CMD SEQ# PS KEY-COLUMN-NAME     ORDER COLTYPE          SRCTYPE   SIZE      N
____ 1      COL1                ASC   CHAR                       8        Y
____ 2      COL2                ASC   CHAR                       8        Y
____ 3      COL3                ASC   CHAR                       8        Y
************************** BOTTOM OF DATA *********************************
          EXPLICIT/IMPLICIT----------------------+
CMD PART VCAT       STOGROUP PRIQTY  SECQTY  ERASE  FRPAGE  %FR
____ 1   _____   SYSDEFLT DEFAULT DEFAULT NO     0       10
____ 2   _____   SYSDEFLT DEFAULT DEFAULT NO     0       10
____ 3   _____   SYSDEFLT DEFAULT DEFAULT NO     0       10
************************** BOTTOM OF DATA *********************************
```

FIG. 7

```
ROPICRE ---------------- CA - Index Create ---------------- 2007/04/20 12:32:45
COMMAND ===> end                                            SCROLL ===> PAGE
RO192I Index attributes have been updated to be compatible with type of index.
Option      => C                    Object   => I            Mode      => O ONLINE
Item Name   => MYINDEX              ) Creator => PDWJB       ) Where    => N
SSID: M81A ----------------------------------------------------------- BARWAC2
Index Name  => MYINDEX              ) Creator => PDWJB       ) Comment      => N
Table Name  => NOIXYET              ) Creator => PDWJB       ) Unique Rule  => NO
Buffer Pool => BP0                  Cluster  => NO           Close Dataset => YES
Partitioned => YES (TS Parts: 3)    GBP Cache => CHANGED     Defer Build   => NO
Piecesize   =>                      Padded   => DEFAULT      Index Type    => P
Copy        =>                                               Define        => YES
CMD SEQ# PS KEY-COLUMN-NAME   ORDER COLTYPE         SRCTYPE    SIZE         N
___  1      COL1              ASC   CHAR                       8            Y
___  2      COL2              ASC   CHAR                       8            Y
___  3      COL3              ASC   CHAR                       8            Y
************************** BOTTOM OF DATA **********************************
             EXPLICIT/IMPLICIT---------------------+
CMD PART VCAT       STOGROUP PRIQTY  SECQTY  ERASE  FRPAGE  %FR
___  1              SYSDEFLT DEFAULT DEFAULT NO     0       10
___  2              SYSDEFLT DEFAULT DEFAULT NO     0       10
___  3              SYSDEFLT DEFAULT DEFAULT NO     0       10
************************** BOTTOM OF DATA **********************************
```

FIG. 8

```
ROPILIM1 -------- Index Partitions Limit Key Values -------- 2007/04/20 12:33:34
COMMAND ===>                                                  SCROLL ===> PAGE
R0319E Enter limit key values to continue "end-processing." Cancel to return.
Enter Limit Key Values.  At minimum, a constant must be present for the first
 index key column of each partition. Unspecified columns will be defaulted by
 DB2.  Enter END after you have completed your changes.

---------------------------------------------- Maintenance Mode => VALUES ONLY
CMND PART COL1     COL2     COL3
     1
     2
     3
xxxxxxxxxxxxxxxxxxxxxxxxxxxxx BOTTOM OF DATA xxxxxxxxxxxxxxxxxxxxxxxxxxxxxxxxx
```

FIG. 9

```
ROPTALT ---------------- CA - Table Alter ---------------- 2007/04/20 10:59:43
COMMAND ===>                                                SCROLL ===> PAGE Option       => A              Object   => T       Mode    => O ONLINE
Item Name    => MYICPTB      > Creator  => PDWJB  > Where   => N
SSID: M81A ------------------------------------------------- BARWAC2     >
Table        => MYICPTB      > Creator  => PDWJB  > Comm/Lab => N
Database     => DBX            Editproc =>         Data Cap => NONE
Tablespace   => MYICPTS        Validproc =>        OBID     =>
Partitioning > NO  (TS Parts: 3)  Audit  => NONE   Volatile => N
Table Type   => REGULAR        Restrict =>         CCSID    => EBCDIC
Row Size     => 27/-4,021      Forgn Key => N      Chk Const > N CMD ### PS COLUMN NAME    COLUMN TYPE      SIZE      N D FORDAT PK UK FK
     1     COL1           CHAR             8         Y N MIXED
     2     COL2           CHAR             8         Y N MIXED
     3     COL3           CHAR             8         Y N MIXED
*************************** BOTTOM OF DATA ********************************
```

FIG. 10

```
ROPIALT ---------------- CA - Index Alter ---------------- 2007/04/20 11
COMMAND ===>                                                   SCROLL ===

Option     => A                  Object  => I        Mode   => O C
Item Name  => MYICPIX            > Creator => PDWJB  > Where => N
SSID: M81A ---------------------------------------------------- B
Index Name => MYICPIX            > Creator => PDWJB  > Comment
Table Name => MYICPTB            > Creator => PDWJB  > Unique Rule
Buffer Pool => BP0               Cluster   => YES    Close Dataset
Partitioned => YES (TS Parts: 3) GBP Cache => CHANGED Defer Build
Piecesize  =>                    Padded    => DEFAULT Index Type
Copy       => NO                                      Define
CMD SEQ# PS KEY-COLUMN-NAME   ORDER COLTYPE          SRCTYPE  SIZE
    1       COL1              ASC   CHAR                       8
    2       COL2              ASC   CHAR                       8
    3       COL3              ASC   CHAR                       8
************************** BOTTOM OF DATA ****************************
         EXPLICIT/IMPLICIT----------------+
CMD PART VCAT      STOGROUP PRIQTY  SECQTY  ERASE  FRPAGE  %FR
    1              SYSDEFLT DEFAULT DEFAULT NO       0      10
    2              SYSDEFLT DEFAULT DEFAULT NO       0      10
    3              SYSDEFLT DEFAULT DEFAULT NO       0      10
************************** BOTTOM OF DATA ****************************
```

FIG. 11

```
ROPIALT ---------------- CA - Index Alter ---------------- 2007/04/20 11:05:05
COMMAND ===>                                                        SCROLL ===> PAGE
RO800E Invalid Index Type option for table. Permissible values: 2 and P.
Option      => A                         Object  => I         Mode        => O ONLINE
Item Name   => MYICPIX                 > Creator => PDWJB     > Where     => N
SSID: M81A -------------------------------------------------------------- BARWAC2
Index Name  => MYICPIX                 > Creator => PDWJB     > Comment      => N
Table Name  => MYICPTB                 > Creator => PDWJB     > Unique Rule  => NO
Buffer Pool => BP0                       Cluster => YES         Close Dataset => YES
Partitioned => YES (TS Parts: 3)         GBP Cache => CHANGED   Defer Build   => NO
Piecesize   =>                           Padded  => DEFAULT     Index Type    => d
Copy        => NO                                               Define        => YES
CMD SEQ# PS KEY-COLUMN-NAME    ORDER COLTYPE         SRCTYPE    SIZE       N
___  1      COL1               ASC   CHAR                       8          Y
___  2      COL2               ASC   CHAR                       8          Y
___  3      COL3               ASC   CHAR                       8          Y
************************* BOTTOM OF DATA ***************************************
         EXPLICIT/IMPLICIT--------------------+
CMD PART VCAT       STOGROUP PRIQTY  SECQTY  ERASE  FRPAGE  %FR
___  1              SYSDEFLT DEFAULT DEFAULT NO     0       10
___  2              SYSDEFLT DEFAULT DEFAULT NO     0       10
___  3              SYSDEFLT DEFAULT DEFAULT NO     0       10
************************* BOTTOM OF DATA ***************************************
```

FIG. 12

```
ROPIALT ---------------- CA - Index Alter ---------------- 2007/04/20 11:07:57
COMMAND ===>                                                      SCROLL ===> PAGE Option      => A                Object   => I          Mode      => 0 ONLINE
Item Name   => MYICPIX         ) Creator => PDWJB     ) Where    => N
SSID: M81A --------------------------------------------------------- BARWAC2
Index Name  => MYICPIX         ) Creator => PDWJB     ) Comment  => N
Table Name  => MYICPTB         ) Creator => PDWJB     ) Unique Rule => NO
Buffer Pool => BP0              Cluster  => YES        Close Dataset => YES
Partitioned => YES (TS Parts: 3) GBP Cache => CHANGED  Defer Build => NO
Piecesize   =>                  Padded   => DEFAULT    Index Type => p
Copy        => NO                                      Define    => YES
CMD SEQ# PS KEY-COLUMN-NAME    ORDER COLTYPE         SRCTYPE  SIZE       N
___  1      COL1               ASC   CHAR                     8          Y
___  2      COL2               ASC   CHAR                     8          Y
___  3      COL3               ASC   CHAR                     8          Y
*************************** BOTTOM OF DATA ****************************

EXPLICIT/IMPLICIT----------------------+
CMD PART VCAT     STOGROUP PRIQTY  SECQTY  ERASE FRPAGE  %FR
___  1            SYSDEFLT DEFAULT DEFAULT NO     0      10
___  2            SYSDEFLT DEFAULT DEFAULT NO     0      10
___  3            SYSDEFLT DEFAULT DEFAULT NO     0      10
*************************** BOTTOM OF DATA ****************************
```

FIG. 13

```
ROPITMP --------------- CA - Index Template --------------- 2007/04/20 11:13:40
COMMAND ===>                                                    SCROLL ===> PAGE Option       => T              Object  => I           Mode      => Q ONLINE
Item Name    => MYICPIX        > Creator => PDWJB     > Where    => N
SSID: M81A ------------------------------------------------------------ BARWAC2
Index Name   => my2ndix        > Creator => PDWJB     > Comment  => N
Table Name   => MYICPTB        > Creator => PDWJB     > Unique Rule => NO
Buffer Pool  => BP0            Cluster  => YES        Close Dataset => YES
Partitioned  => YES (TS Parts: 3)  GBP Cache => CHANGED  Defer Build => NO
Piecesize    =>                Padded   => DEFAULT    Index Type   => 2
Copy         => NO                                    Define       => YES
CMD SEQ# PS KEY-COLUMN-NAME   ORDER COLTYPE         SRCTYPE  SIZE       N
___   1    COL1               ASC   CHAR                      8         Y
___   2    COL2               ASC   CHAR                      8         Y
___   3    COL3               ASC   CHAR                      8         Y
*********************** BOTTOM OF DATA ***********************************
          EXPLICIT/IMPLICIT--------------------+
CMD PART VCAT      STOGROUP PRIQTY  SECQTY  ERASE  FRPAGE   %FR
___  1   _____  SYSDEFLT DEFAULT DEFAULT NO      0       10
___  2   _____  SYSDEFLT DEFAULT DEFAULT NO      0       10
___  3   _____  SYSDEFLT DEFAULT DEFAULT NO      0       10
*********************** BOTTOM OF DATA ***********************************
```

FIG. 15

```
ROPITMP --------------- CA - Index Template --------------- 2007/04/20 11:17:37
COMMAND ===>                                                      SCROLL ===> PAGE Option        => T              Object    => I        Mode       => O ONLINE
Item Name     => MYICPIX        ) Creator => PDWJB    ) Where    => N
SSID: M81A ---------------------------------------------------------- BARWAC2
Index Name    => MY2NDIX        ) Creator => PDWJB    ) Comment    => N
Table Name    => MYICPTB        ) Creator => PDWJB    ) Unique Rule => NO
Buffer Pool   => BP0            Cluster   => NO       Close Dataset => YES
Partitioned   => YES (TS Parts: 3)  GBP Cache => CHANGED  Defer Build  => NO
Piecesize     =>                Padded    => DEFAULT  Index Type   => P
Copy          => NO                                   Define       => YES
CMD SEQ# PS KEY-COLUMN-NAME    ORDER COLTYPE       SRCTYPE   SIZE       N
___  1   1  COL1                ASC   CHAR                    8         Y
___  2   2  COL2                ASC   CHAR                    8         Y
___  3   3  COL3                ASC   CHAR                    8         Y
*********************** BOTTOM OF DATA ***********************
          EXPLICIT/IMPLICIT--------------------+
CMD PART VCAT    STOGROUP PRIQTY  SECQTY  ERASE  FRPAGE  %FR RO376I Index Type changed to P: key is a matching or superset of clustering
  index key.
```

FIG. 16

```
ROPITMP ---------------- CA - Index Template ---------------- 2007/04/20 11:19:55
COMMAND ===>                                                     SCROLL ===> PAGE Option       => T              Object    => I         Mode     => O ONLINE
Item Name    => MYICPIX       > Creator  => PDWJB    > Where    => N
SSID: M81A -------------------------------------------------------------- BARWAC2
Index Name   => MY2NDIX       > Creator  => PDWJB    > Comment  => N
Table Name   => MYICPTB       > Creator  => PDWJB    > Unique Rule => NO
Buffer Pool  => BP0            Cluster   => yes       Close Dataset => YES
Partitioned  => YES (TS Parts: 3)  GBP Cache => CHANGED   Defer Build  => NO
Piecesize    =>                Padded    => DEFAULT   Index Type   => P
Copy         => NO                                     Define       => YES
CMD SEQ# PS KEY-COLUMN-NAME    ORDER COLTYPE         SRCTYPE  SIZE          N
___  1   1  COL1               ASC   CHAR                     8             Y
___  2   2  COL2               ASC   CHAR                     8             Y
___  3   3  COL3               ASC   CHAR                     8             Y
xxxxxxxxxxxxxxxxxxxxxxxxxxxxxx BOTTOM OF DATA xxxxxxxxxxxxxxxxxxxxxxxxxxxxxx EXPLICIT/IMPLICIT---------------------+
CMD PART VCAT     STOGROUP PRIQTY  SECQTY  ERASE  FRPAGE  %FR
___  1            SYSDEFLT DEFAULT DEFAULT NO     0       10
___  2            SYSDEFLT DEFAULT DEFAULT NO     0       10
___  3            SYSDEFLT DEFAULT DEFAULT NO     0       10
xxxxxxxxxxxxxxxxxxxxxxxxxxxxxx BOTTOM OF DATA xxxxxxxxxxxxxxxxxxxxxxxxxxxxxx
```

FIG. 17

```
ROPITMP ---------------- CA - Index Template --------------- 2007/04/20 11:21:11
COMMAND ===>                                                        SCROLL ===> PAGE
R04401 Cluster changed to NO because table already has a clustering index.
Option       => T                    Object   => I           Mode   => O ONLINE
Item Name    => MYICPIX              ) Creator => PDWJB      ) Where => N
SSID: M81A -------------------------------------------------------------- BARWAC2
Index Name   => MY2NDIX              ) Creator => PDWJB      ) Comment      => N
Table Name   => MYICPTB              ) Creator => PDWJB      ) Unique Rule  => NO
Buffer Pool  => BP0                  Cluster  => NO          Close Dataset => YES
Partitioned  => YES (TS Parts: 3)    GBP Cache => CHANGED    Defer Build   => NO
Piecesize    =>                      Padded   => DEFAULT     Index Type    => P
Copy         => NO                                           Define        => YES
CMD SEQ# PS KEY-COLUMN-NAME       ORDER COLTYPE          SRCTYPE   SIZE        N
___  1    1 COL1                  ASC   CHAR                       8          Y
___  2    2 COL2                  ASC   CHAR                       8          Y
___  3    3 COL3                  ASC   CHAR                       8          Y
*************************** BOTTOM OF DATA ****************************

EXPLICIT/IMPLICIT------------------+
CMD PART VCAT       STOGROUP PRIQTY  SECQTY  ERASE  FRPAGE  %FR
___  1              SYSDEFLT DEFAULT DEFAULT NO       0     10
___  2              SYSDEFLT DEFAULT DEFAULT NO       0     10
___  3              SYSDEFLT DEFAULT DEFAULT NO       0     10
*************************** BOTTOM OF DATA ****************************
```

FIG. 18

```
ROPITMP ---------------- CA - Index Template ---------------- 2007/04/20 11:23:33
COMMAND ===>                                                  SCROLL ===> PAGE Option       => T              Object   => I         Mode    => 0 ONLINE
Item Name    => MYICPIX        ) Creator => PDWJB    ) Where => N
SSID: M81A -------------------------------------------------------- BARWAC2
Index Name   => MV2NDIX        ) Creator => PDWJB    ) Comment     => N
Table Name   => MYICPTB        ) Creator => PDWJB    ) Unique Rule => NO
Buffer Pool  => BP0            Cluster  => NO        Close Dataset => YES
Partitioned  => YES (TS Parts: 3) GBP Cache => CHANGED  Defer Build => NO
Piecesize    =>                Padded   => DEFAULT   Index Type   => P
Copy         => NO                                   Define       => YES
CMD SEQ# PS KEY-COLUMN-NAME   ORDER COLTYPE          SRCTYPE  SIZE      N
___  1   1  COL1              ASC   CHAR                      8         Y
___  2   2  COL2              ASC   CHAR                      8         Y
d__  3   3  COL3              ASC   CHAR                      8         Y
************************** BOTTOM OF DATA ***************************

EXPLICIT/IMPLICIT--------------------+
CMD PART VCAT       STOGROUP PRIQTY  SECQTY  ERASE  FRPAGE  %FR
___  1              SYSDEFLT DEFAULT DEFAULT NO     0       10
___  2              SYSDEFLT DEFAULT DEFAULT NO     0       10
___  3              SYSDEFLT DEFAULT DEFAULT NO     0       10
************************** BOTTOM OF DATA ***************************
```

FIG. 19

```
ROPITMP ---------------- CA - Index Template ---------------- 2007/04/20 11:24:27
COMMAND ===>                                                  SCROLL ===> PAGE Option       => T                 Object   => I          Mode      => O ONLINE
Item Name    => MVICPIX          ) Creator => PDWJB     ) Where    => N
SSID: M81A --------------------------------------------------------- BARWAC2
Index Name   => MV2NDIX          ) Creator => PDWJB     ) Comment     => N
Table Name   => MVICPTB          ) Creator => PDWJB     ) Unique Rule => NO
Buffer Pool  => BP0               Cluster  => NO         Close Dataset => YES
Partitioned  => YES (TS Parts: 3) GBP Cache => CHANGED   Defer Build => NO
Piecesize    =>                   Padded   => DEFAULT    Index Type  => D
Copy         => NO                                       Define      => YES
CMD SEQ# PS KEY-COLUMN-NAME    ORDER COLTYPE         SRCTYPE   SIZE      N
    1   1  COL1                ASC   CHAR                      8         Y
    2   2  COL2                ASC   CHAR                      8         Y
*************************** BOTTOM OF DATA ***************************

EXPLICIT/IMPLICIT--------------------+
CMD PART VCAT      STOGROUP PRIQTY  SECQTY  ERASE  FRPAGE  %FR

RO375I Index Type changed to D: key not a matching or superset of clustering
 index key.
```

FIG. 20

```
CREATE  INDEX PDWJB.MYICPIX ON PDWJB.MYICPTB
        ( COL1 ASC, COL2 ASC, COL3 ASC )
        PARTITIONED
        USING STOGROUP SYSDEFLT
        ERASE NO FREEPAGE 0 PCTFREE 10
        BUFFERPOOL BP0 CLOSE YES;
```

FIG. 21

```
CREATE  INDEX PDWJB.MYICPIX ON PDWJB.MYICPTB
        ( COL1 ASC, COL2 ASC )
        PARTITIONED
        USING STOGROUP SYSDEFLT
        ERASE NO FREEPAGE 0 PCTFREE 10
        BUFFERPOOL BP0 CLOSE YES;
```

FIG. 22

```
ROPTALT ---------------- CA - Table Alter ---------------- 2007/04/30 09:19:40
COMMAND ===>                                                SCROLL ===> PAGE Option      =) A              Object   =) T         Mode    =) O ONLINE
Item Name   =) MYTCPTB      ) Creator  =) PDWJB   ) Where   =) N
SSID: M81A ------------------------------------------------ BARWAC2       )
Table       =) MYTCPTB      ) Creator  =) PDWJB   ) Comm/Lab =) N
Database    =) DSNDB04        Editproc =)           Data Cap =) NONE
Tablespace  =) MYTCPTS        Validproc=)           OBID     =)
Partitioning) YES (TS Parts: 3)  Audit =) NONE      Volatile =) N
Table Type  =) REGULAR        Restrict =)           CCSID    =) EBCDIC
Row Size    =) 45/-4,003      Forgn Key=) N         Chk Const) N CMD ### PS COLUMN NAME    COLUMN TYPE      SIZE    N D FORDAT PK UK FK
___  1  1  COL1           CHAR             8       Y N MIXED
___  2  2  COL2           CHAR             8       Y N MIXED
___  3  3  COL3           CHAR             8       Y N MIXED
___  4     COL4           CHAR             8       Y N MIXED
___  5     COL5           CHAR             8       Y N MIXED
************************** BOTTOM OF DATA ***************************
```

FIG. 23

```
ROPICRE --------------- CA - Index Create --------------- 2007/04/30 08:50:25
COMMAND ===> key                                          SCROLL ===> PAGE Option      => C              Object   => I        Mode       => 0 ONLINE
Item Name   => MYTCPIX       ) Creator => PDWJB   ) Where     => N
SSID: M81A ----------------------------------------------------- BARWAC2
Index Name  => MYTCPIX       ) Creator => PDWJB   ) Comment   => N
Table Name  => MYTCPTB       ) Creator => PDWJB   ) Unique Rule => NO
Buffer Pool => BP0            Cluster  => YES      Close Dataset => YES
Partitioned => YES (TS Parts: 3)  GBP Cache => CHANGED   Defer Build => NO
Piecesize   =>                Padded   => DEFAULT  Index Type => 2
Copy        =>                                     Define     => YES
CMD SEQ# PS KEY-COLUMN-NAME  ORDER COLTYPE       SRCTYPE  SIZE       N
            <- THERE ARE NO KEY COLUMNS DEFINED FOR THIS INDEX ->
___
************************** BOTTOM OF DATA ****************************
         EXPLICIT/IMPLICIT--------------------+
CMD PART VCAT    STOGROUP PRIQTY  SECQTY  ERASE  FRPAGE  %FR
___  1           SYSDEFLT DEFAULT DEFAULT NO     0       10
___  2           SYSDEFLT DEFAULT DEFAULT NO     0       10
___  3           SYSDEFLT DEFAULT DEFAULT NO     0       10
************************** BOTTOM OF DATA ****************************
```

FIG. 24

```
ROPICOL1 ----- Index Column Selection & Key Maintenance ---- 2007/04/30 08:52:11
COMMAND ===>                                                 SCROLL ===> PAGE Select the columns you wish to insert by placing an S beside the column name.
  You may optionally specify a block of columns by appending a number after
  the S or by using the SS block command.  Press HELP for more information.

Column Name Selection ------------------------- Unused Cols List - Hide ==> N
CMD COL# PS Column Name         COLTYPE          SRCTYPE  SIZE         N
___  1   1  COL1                CHAR                      8            Y
___  2   2  COL2                CHAR                      8            Y
___  3   3  COL3                CHAR                      8            Y
___  4      COL4                CHAR                      8            Y
___  5      COL5                CHAR                      8            Y
XXXXXXXXXXXXXXXXXXXXXXXXXXXXX BOTTOM OF DATA XXXXXXXXXXXXXXXXXXXXXXXXXXXXX Arrange the columns in the key and set the ORDER of each column to either ASC
(ascending) or DESC (descending).  Press PF3 when you are finished.

Index Key ---------------------------------------------------------------
CMD SEQ# PS KEY-COLUMN-NAME    ORDER COLTYPE          SRCTYPE  SIZE         N
___         <-   THERE ARE NO KEY COLUMNS DEFINED FOR THIS INDEX   ->
XXXXXXXXXXXXXXXXXXXXXXXXXXXXX BOTTOM OF DATA XXXXXXXXXXXXXXXXXXXXXXXXXXXXX
```

FIG. 25

```
ROPICOL1 ---- Index Column Selection & Key Maintenance --- 2007/04/30 08:52:11
COMMAND ===>                                                      SCROLL ===> PAGE Select the columns you wish to insert by placing an S beside the column name.
  You may optionally specify a block of columns by appending a number after
  the S or by using the SS block command. Press HELP for more information.

Column Name Selection ---------------------- Unused Cols List - Hide ==> N
CMD COL# PS Column Name       COLTYPE            SRCTYPE   SIZE         N
s    1   1  COL1              CHAR                         8            Y
s    2   2  COL2              CHAR                         8            Y
s    3   3  COL3              CHAR                         8            Y
     4      COL4              CHAR                         8            Y
     5      COL5              CHAR                         8            Y
xxxxxxxxxxxxxxxxxxxxxxxxxxxx BOTTOM OF DATA xxxxxxxxxxxxxxxxxxxxxxxxxxxxx Arrange the columns in the key and set the ORDER of each column to either ASC
(ascending) or DESC (descending). Press PF3 when you are finished.

Index Key -------------------------------------------------------------------
CMD SEQ# PS KEY-COLUMN-NAME   ORDER COLTYPE         SRCTYPE   SIZE         N
            <- THERE ARE NO KEY COLUMNS DEFINED FOR THIS INDEX ->
xxxxxxxxxxxxxxxxxxxxxxxxxxxx BOTTOM OF DATA xxxxxxxxxxxxxxxxxxxxxxxxxxxxx
```

FIG. 26

```
ROPICOL1 ----- Index Column Selection & Key Maintenance --- 2007/04/30 08:55:33
COMMAND ===)                                                 SCROLL ===) PAGE
RO2471 Your selection(s) have been auto-inserted into the key.
Select the columns you wish to insert by placing an S beside the column name.
  You may optionally specify a block of columns by appending a number after
  the S or by using the SS block command. Press HELP for more information.

Column Name Selection ------------------------- Unused Cols List - Hide ==) N
CMD COL# PS Column Name      COLTYPE          SRCTYPE    SIZE         N
___  4      COL4             CHAR                        8            Y
___  5      COL5             CHAR                        8            Y
XXXXXXXXXXXXXXXXXXXXXXXXXXXX BOTTOM OF DATA XXXXXXXXXXXXXXXXXXXXXXXXXXXX Arrange the columns in the key and set the ORDER of each column to either ASC
(ascending) or DESC (descending). Press PF3 when you are finished.

Index Key ---------------------------------------------------------------
CMD SEQ# PS KEY-COLUMN-NAME  ORDER COLTYPE         SRCTYPE    SIZE      N
___  1   1  COL1             ASC   CHAR                       8         Y
___  2   2  COL2             ASC   CHAR                       8         Y
___  3   3  COL3             ASC   CHAR                       8         Y
```

FIG. 27

```
ROPICRE ------------------ CA - Index Create ------------------ 2007/04/20 11:38:02
COMMAND ===>                                                        SCROLL ===> PAGE Option      => C                  Object  => I          Mode    => O ONLINE
Item Name   => MYTCPIX           ) Creator => PDWJB    ) Where  => N
SSID: M81A ------------------------------------------------------------- BARWAC2
Index Name  => MYTCPIX           ) Creator => PDWJB    ) Comment     => N
Table Name  => MYTCPTB           ) Creator => PDWJB    ) Unique Rule => NO
Buffer Pool => BP0                Cluster  => YES       Close Dataset => YES
Partitioned => YES (TS Parts: 3)  GBP Cache => CHANGED  Defer Build  => NO
Piecesize   =>                    Padded   => DEFAULT   Index Type   => P
Copy        =>                                          Define       => YES
CMD SEQ# PS KEY-COLUMN-NAME    ORDER COLTYPE        SRCTYPE    SIZE      N
___  1   1  COL1               ASC   CHAR                      8         Y
___  2   2  COL2               ASC   CHAR                      8         Y
___  3   3  COL3               ASC   CHAR                      8         Y
*********************** BOTTOM OF DATA ***********************************

EXPLICIT/IMPLICIT-------------------+
CMD PART VCAT     STOGROUP PRIQTY  SECQTY  ERASE  FRPAGE  %FR
┌─────────────────────────────────────────────────────────────────┐
│ R0379I Index Type changed to P: key is a matching or superset of table's │
│ partitioning key.                                               │
└─────────────────────────────────────────────────────────────────┘
                                                                 ***
```

FIG. 28

```
ROPICOL1 ----- Index Column Selection & Key Maintenance --- 2007/04/30 08:58:03
COMMAND ===>                                                    SCROLL ===> PAGE Select the columns you wish to insert by placing an S beside the column name.
   You may optionally specify a block of columns by appending a number after
   the S or by using the SS block command.  Press HELP for more information.

Column Name Selection ------------------------- Unused Cols List - Hide ==> N
CMD COL# PS Column Name         COLTYPE         SRCTYPE      SIZE        N
___   1   1 COL1                CHAR                         8           Y
s_    2   2 COL2                CHAR                         8           Y
s_    3   3 COL3                CHAR                         8           Y
___   4     COL4                CHAR                         8           Y
___   5     COL5                CHAR                         8           Y
xxxxxxxxxxxxxxxxxxxxxxxxxxxxxx BOTTOM OF DATA xxxxxxxxxxxxxxxxxxxxxxxxxxxxxx Arrange the columns in the key and set the ORDER of each column to either ASC
(ascending) or DESC (descending).  Press PF3 when you are finished.

Index Key -------------------------------------------------------------------
CMD SEQ# PS KEY-COLUMN-NAME    ORDER COLTYPE        SRCTYPE      SIZE        N
_____     <-   THERE ARE NO KEY COLUMNS DEFINED FOR THIS INDEX  ->
xxxxxxxxxxxxxxxxxxxxxxxxxxxxxx BOTTOM OF DATA xxxxxxxxxxxxxxxxxxxxxxxxxxxxxx
```

FIG. 29

```
ROPICRE ---------------- CA - Index Create ---------------- 2007/04/20 11:41:29
COMMAND ===>                                                    SCROLL ===> PAGE Option      => C                 Object  => I          Mode    => O ONLINE
Item Name   => MYTCPIX          ) Creator => PDWJB    ) Where  => N
SSID: M81A ------------------------------------------------------------- BARWAC2
Index Name  => MYTCPIX          ) Creator => PDWJB    ) Comment      => N
Table Name  => MYTCPTB          ) Creator => PDWJB    ) Unique Rule  => NO
Buffer Pool => BP0               Cluster  => YES       Close Dataset => YES
Partitioned => YES (TS Parts: 3) GBP Cache => CHANGED  Defer Build   => NO
Piecesize   =>                   Padded    => DEFAULT  Index Type    => D
Copy        =>                                         Define        => YES
CMD SEQ# PS KEY-COLUMN-NAME    ORDER COLTYPE        SRCTYPE  SIZE       N
___  1   2  COL2               ASC   CHAR                    8          Y
___  2   3  COL3               ASC   CHAR                    8          Y
************************ BOTTOM OF DATA ************************

EXPLICIT/IMPLICIT-------------------+
CMD PART VCAT    STOGROUP PRIQTY  SECQTY  ERASE  FRPAGE  %FR

R03781 Index Type changed to D: key not a matching or superset of table's
 partitioning key.
                                                                          **
```

FIG. 30

METHOD AND APPARATUS TO FACILITATE THE CREATING AND ALTERING OF INDEX OBJECTS ON TABLES

CROSS-REFERENCE TO RELATED APPLICATIONS

This application discloses subject matter similar to that discussed in commonly-owned, co-pending U.S. application Ser. No. 12/023,069, filed on Jan. 31, 2008, entitled "A Method and Apparatus for Pseudo-Conversion of Table Objects," which is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of data base administration and more particularly relates to the field of altering index objects in tables.

BACKGROUND OF THE INVENTION

In past versions of DB2, the creation and managing of indexes for regular tables was fairly simple and straightforward, with generally only two kinds of indexes as it pertained to partitioning: namely, partitioned and non-partitioned; and, the definition and allowable attributes of each was not significantly influenced by the kind of table for which it was being created. For example, a regular non-partitioned table may optionally have a non-partitioned index that was either clustering or not clustering, but may not have a partitioned index; while, a partitioned table required, at minimum, a partitioned clustering index; and, the mere creation of an index would not cause any underlying implicit changes to the table and its definition.

With the advent of DB2 version 8, however, this has all changed. Now, creating, altering and managing indexes can be much more complex and involved; and, the mere alteration or creation of an index can have significant ramifications to the table and its definition—causing implicit changes to occur that cannot be undone without dropping and recreating the table and (quite possibly, depending on the kinds of objects,) all of its dependent objects.

Additionally, although a table may have multiple indexes, which was just as true prior to DB2 version 8 as it is today; tables may now have a considerably larger and more diverse combination of different kinds of indexes. Whereas, some new kinds of indexes may also influence the attributes and kind of index that may be subsequently added; how others may be altered; whether or not the creation of one kind over another will cause implicit changes to the table for which it is being created; and, more scenarios dictating whether or not a certain kind of an index would be valid at all.

Add to this, virtual objects or real objects with virtual changes in an RC/Migrator Alteration, Migration or Compare strategy, and the difficulty in keeping track of each change to other multiple objects and how each change will influence the (implicit or explicit) alteration or creation of still other objects (wanted or not,) the attributes that may be legally specified based on other objects, virtual or real, their changes, virtual or real, becomes a daunting, if not impossible, error-prone task if not for the invention of some new tools.

With all the new rules and regulations that are now in play and the ever increasing potential for error and surprises, it was discovered that it can be quite time consuming and frustrating trying to determine exactly what the creation of a certain kind of index, or the alteration of an existing index, would yield—not to mention the fact that the intended creation of a new index or alteration of an existing index may yield an index that is of a kind that was not wanted or an implicit (irreversible) change to the table due to an inadvertent oversight, fatigue and generally the unavoidable element of simple human error.

In light of all this, it became necessary to invent a method to facilitate the creation, alteration and general management of all these new kinds of indexes based on the kind of table object, whether the index would cause the table object to be implicitly converted to use TCP, and etc.; while at the same time minimizing, if not entirely eliminating, the element of error and guaranteeing generated DDL (Data Definition Language) statements that will not only successfully execute, but will also yield the expected changes to DB2 table and index objects with no surprises.

SUMMARY OF THE INVENTION

Briefly, according to an embodiment of the invention a method for facilitating creation and managing of partitioned table indices of a table object of a first partitioning type includes steps or acts of: automatically looking up a table and its partitioning type definition; retrieving the table index and all indices defined for that table object, and their definitions; presenting to a user at least a portion of the table index in a single set of index alter screens; receiving from the user an alter request in the form of a screen option; performing validity checking on the screen option, based on the index type. If the screen option is not compatible with the index type, the method automatically overrides the screen option with one that is compatible, and issues a diagnostic message. If the screen option is valid for the index type, the user is notified about the changes that will be made and the effect of those changes. Data definition language statements are then generated consistent with the screen options.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 1 shows a partitioned three-columned table not using table-controlled partitioning with no index defined, according to an embodiment of the present invention;

FIG. 2 shows the table of FIG. 1 while creating a clustering Type-2 index, according to an embodiment of the invention;

FIG. 3 shows the syntax of the CREATE INDEX statement with a CLUSTER clause, according to an embodiment of the present invention;

FIG. 4 shows the syntax of a CREATE INDEX statement without the CLUSTER clause, according to an embodiment of the present invention;

FIG. 5 shows a index with the Cluster option set to YES and the Partitioned option set to YES, according to an embodiment of the present invention;

FIG. 6 shows a index with the index type changed to P, according to an embodiment of the present invention;

FIG. 7 shows the index of FIG. 6 with the Cluster option set to NO, according to an embodiment of the present invention;

FIG. 8 shows the index with the END command selected, according to an embodiment of the present invention;

FIG. 9 shows a solicitation screen for limit key values for the index partitions, according to an embodiment of the present invention;

FIG. 10 shows a partitioned table with three columns, using index-controlled partitioning, according to an embodiment of the present invention;

FIG. 11 shows the index belonging to the table of FIG. 10 with an option to change the index, according to an embodiment of the present invention;

FIG. 12 shows the index of FIG. 11 with an error message, according to an embodiment of the present invention;

FIG. 13 shows the index belonging to the table of FIG. 10 to be changed from a type-2 partitioned clustering index into a type-P clustering index, according to an embodiment of the present invention;

FIG. 15 shows a second partitioned index being created on a table using ICP, according to an embodiment of the present invention;

FIG. 16 shows an error message after defining the second index by templating the table's type-2 partitioned clustering index; according to an embodiment of the present invention;

FIG. 17 shows the index of FIG. 16 with the CLUSTER option set to YES, according to an embodiment of the present invention;

FIG. 18 shows the CLUSTER option returned to its previous setting, according to an embodiment of the present invention;

FIG. 19 shows a index with a key column being deleted, according to an embodiment of the present invention;

FIG. 20 shows the index with an alert, according to an embodiment of the present invention;

FIG. 21 shows the syntax for a CREATE statement, according to an embodiment of the present invention;

FIG. 22 shows the syntax for a CREATE statement specifying only two columns, according to an embodiment of the present invention;

FIG. 23 shows a partitioned table with five columns, according to an embodiment of the present invention;

FIG. 24 shows the index being created on table of FIG. 23 with all required fields filled in, according to an embodiment of the present invention;

FIG. 25 shows the index of FIG. 24 with its column screen displayed, according to an embodiment of the present invention;

FIG. 26 shows the column screen of index of FIG. 24, with all three columns with PS selected, according to an embodiment of the present invention;

FIG. 27 shows the column screen of FIG. 26 with the moved columns at the bottom of the screen, according to an embodiment of the present invention;

FIG. 28 shows the Index Create screen of index of FIG. 24, according to an embodiment of the present invention;

FIG. 29 shows the column screen of index of FIG. 24, with only two columns with PS selected, according to an embodiment of the present invention;

FIG. 30 shows the Index Create screen of index of FIG. 24 with the type-changed to D, according to an embodiment of the present invention;

Figure 14:
FIG. 14 shows the index of FIG. 13 with the partitioning key sequence number for each key column, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method and apparatus for automatically looking up a table and its definition, retrieving the index and all indices defined for that table and their corresponding definitions (for both a real and virtual table). This information is used to facilitate the creating and managing of partitioned indices by:

a) alerting the user as to a change in the type of index according to the type that will be implicitly created by DB2 based on the table columns selected for the index's key;

b) performing validity checking on screen options based on index type;

c) automatically changing screen options so that they are compatible with the type of index being created; and d) alerting the user as to whether there will be an explicit (irreversible) conversion of the table object from ICP to TCP (or vice versa).

Throughout this document, the terms virtual or real, as used to refer to the objects definition, have the following meaning:

Virtual objects are those whose definitions are stored in a data structure (in volatile or non-volatile storage) outside of the DB2 catalog and have not yet been physically created and defined.

Virtual changes are those changes applied to an object's definition that are stored in a data structure (in volatile or non-volatile storage) outside of the DB2 catalog and have not yet been applied to the real object defined in the DB2 catalog.

Real objects are those that have been physically created and whose definition is stored in the DB2 catalog.

Referring now in specific detail to the drawings, and particularly FIG. 1, there is illustrated a partitioned table with three columns that is not using table-controlled partitioning and has no index defined. Since FIG. 1 shows altering of the table, we can assume that the table is real and not virtual—i.e., it is defined in the DB2 catalog as not using either TCP or ICP. It is important to note that this demonstration is equally applicable for an unrealized table that has been created and persists only as a virtual object in an RC/Migrator strategy where the index is likewise also virtual and is created in the same RC/Migrator strategy.

In order for this table to be complete so that it is usable, it must be converted to use TCP or a partitioned clustering index must be defined for the table. Either can be done through the creation of a partitioned index on the table.

For the purpose of this demonstration, we will start out by creating a clustering index for the table in FIG. 1. We presumably do not want the table defined to use TCP, so we must take care that the index we create causes the table to use ICP and does not cause an implicit conversion of the table to TCP. This would normally be the responsibility of the user; however, this embodiment ensures that the user may effortlessly and confidently create, and is fully aware of, the exact kind of index that will be created—guaranteed—with no guesswork or surprises.

Referring to FIG. 2, we have already filled in the name for our index, its creator, the name of the table and its creator for the index, and also set other fields, with some defaulting for us, such as Cluster, Partitioned and Index Type. We also selected the key columns for our index.

Since we want to create a partitioned clustering index for the table so that the table uses ICP, we can leave the Index Type set to 2, as is further documented in this description of the Index Type field:

Index Type is used to specify the type of index. Its setting also influences the behavior of the Alter, Create and Template screens, assists validation processing in determining the values that may be specified for certain other options on the screens and how or what DDL clauses are to be generated. Valid values for this option are:

2 Type 2 index. Required for non-partitioned indexes; and, for partitioned clustering indexes on tables using index-controlled partitioning.

D Data-Partitioned Secondary Index (DPSI.) Allowed when the table object is using table-controlled partitioning.

P Partitioning Index. Allowed when the table is using table-controlled partitioning and the index's key is a matching or superset of the table's partitioning key.

On a Create, unless overridden using Object Definition Defaults, this field initially defaults to 2. Its implicit/explicit default may subsequently be overridden by RC/Objects to an alternate value so that it is compatible with other attributes for the current index and other index objects that are already defined for the table object. When this happens, you will be informed with a diagnostic message for which you may press HELP to get detailed information as to the reason for the override.

This field is supported by Object Definition Defaults. For information on Object Definition Defaults, please refer to the DEFAULTS primary command. IMPORTANT: Some validation processing for conflicting or allowable options is performed based on available information about the table and tablespace. If the table object or its tablespace is not defined or cannot be found, some validation processing may not be performed and you will be allowed to specify options that may either conflict or be inapplicable to the table object for which DDL is to be generated, subsequently causing DDL to be generated that may not execute on the subsystem on which it is generated.

Next, we change the Partitioned option to YES. Notice that we will intentionally leave the Cluster option set to NO so that we can see what happens, as shown in FIG. 5, after we press the Enter key. What is important to note at this time is that the syntax of the CREATE INDEX statement does not provide a means to explicitly indicate the type of index that is wanted, which means that DB2 may implicitly create the type based on the presence or absence of a single clause, as is shown in FIG. 3 and FIG. 4, thus potentially yielding an undesirable type, or worse, an implicit irreversible change to the table.

The only difference between the two CREATE INDEX statements in these two figures is the CLUSTER clause. In FIG. 3, the CLUSTER clause is present, which will cause a type-2 index to be created so that the table uses ICP. However, in FIG. 4, the CLUSTER clause is absent. This will cause a type-P index to be created and will also cause the table to be implicitly (and irreversibly) converted to use TCP instead of ICP.

This invention solves this problem by providing a means on the Index Create screen to explicitly specify exactly what kind of index is wanted so that there is absolutely no doubt. This ensures the generation of a CREATE INDEX statement with the appropriate syntax and clauses that will guarantee that the specific type of index that is specified on the screen will indeed be created, while also ensuring that there are no option settings or attributes that conflict with the intent to create that specific type of index.

Referring to FIG. 5, when the Enter key is pressed, since a type-2 index was specified for Index Type, the Cluster option is automatically changed to YES so as to be compatible with the (presumed) desire to create a type-2 index and the user is automatically alerted to this fact so that there is no doubt. When generating the DDL statement for creating this index, a like statement, as in FIG. 3 that includes the CLUSTER clause, will be built.

In addition to inspecting the Index Type and verifying that the other options on the screen are appropriately set, and changing them if necessary so that they are compatible with said Index Type, the table's current partitioning is also inspected, as is described in more detail for the RO192I diagnostic message:

RO192I is an informational message indicating that one or more attributes for your index have been automatically updated for you so as to be compatible with the type of index you are creating or altering, as specified/indicated by the Index Type option on the Index Alter, Create or Template screen. The following table shows the affected attributes that pertain to this message and the values to which they are automatically set based on partitioning and index type.

Notes: n/a Indicates that the attribute is of no consequence or not impacted.

(1) On a CREATE, when the table object is not using TCP and no clustering index is defined (i.e. table has no limit values) value YES is not allowed because DB2 cannot create a clustering partitioning index until limit values are defined for the table; however, DB2 can create a non-clustering partitioning index if limit values are also included so that DB2 can implicitly convert the table object to use TCP. For this to happen, Cluster must be NO. (Also see Tip below concerning ALTERs.)

If table object already has a clustering index defined, message RO440 may be issued instead. If you want to generate ALTER INDEX statements for a partitioned clustering index that will convert the partitioned table to use table-controlled partitioning instead of index-controlled partitioning using the method of altering CLUSTER to NOT CLUSTER and then back to CLUSTER, simply change the Index Type on the Index Alter screen to P. The Cluster option will remain set to YES for you. (You may optionally set Cluster to NO if you do not want the index changed back to a clustering index.) This behavior is available on an Alter, only.

Likewise, if Index Type is changed to P (see FIG. 6) the Cluster option is automatically changed to NO, as shown below (see FIG. 7) according to this part (footnote 1) of RO192I's message description:

(1) On a CREATE, when the table object is not using TCP and no clustering index is defined (i.e. table has no limit values) value YES is not allowed because DB2 cannot create a clustering partitioning index until limit values are defined for the table; however, DB2 can create a non-clustering partitioning index if limit values are also included so that DB2 can implicitly convert the table object to use TCP. For this to happen, Cluster must be NO. (Also see Tip below concerning ALTERs.)

Thus facilitating valid DDL generation and guaranteeing a definition for the index that is compatible with the real or virtual table object when the DDL is actually executed.

What happens when END is entered and the user wants to save the changes or otherwise generate the DDL to actually create the index? Did we forget anything? The interesting thing about creating indexes with DB2 version 8 is that depending on the definition of the table object, a type-P index may or may not require additional clauses. So, we'll switch gears a bit and let us now presume that we want to create a non-clustering type-P index—knowing full well that this will cause our table to be implicitly converted to use TCP instead of ICP. Presuming that we are done with supplying whatever is required in order to generate the DDL necessary for creating our non-clustering type-P index, we enter the END command as shown in FIG. 8.

Since we forgot all about our limit key values—because we (probably) forgot that when creating a type-P index on a partitioned table that is incomplete (i.e. is neither defined as using ICP or TCP)—we must now supply them before valid DDL can be generated for us or before our changes can be saved. Without these values, valid DDL cannot be generated; and, if the user were to manually do the same and, like we just did here, inadvertently omit these values (which is completely valid if the table were already defined as using TCP,) the DDL would fail with an SQL Error. So, we make sure that we have everything that we require before trying to generate DDL or save the changes when leaving the Index Create screen. The description of the RO319E message provides more information for the user:

RO319E is an error message indicating that the user pressed END/PF3, or otherwise attempted to save changes or generate DDL, and no limit key values are specified for your partitioning table or index.

Before "end-processing" can continue, you need to specify, at minimum, a limit value for the first key column of each partition defined in your partitioning table or index. If you do not want to enter limit values at this time, you can press CANCEL to return to the Table or Index Create/Alter screen so you can continue altering or creating your partitioning table or index. Important: What is unique with this invention, as was touched on earlier, is that we inspect both the type of index being created as well as the (real or virtual) definition of the table for which the index is being created. So, for example, if the table was already defined as using TCP, the table would already have limit values defined; and, if this were the case, limit values would not only be not required, but specifying them on the CREATE INDEX statement would also be illegal and would cause an SQL Error if the DDL were to include them; therefore, under such a circumstance, the screen shown here in FIG. 3 would not have displayed at all and the DDL would have been generated without limit values—even though the type-P index were created with the exact same options and settings on the Index Create screen. (This scenario is demonstrated and described in more detail under subsection "Creating a Partitioned Index on Table that is using TCP" later in this document.)

On the other hand, if we were to actually follow-through with creating a type-2 clustering index as we started out to do, since a type-2 clustering index can only be created on an incomplete partitioned table, the screen shown in FIG. 9 would always display under similar circumstances.

Referring to FIG. 10, we have a partitioned table with three columns that is using index-controlled partitioning. Since FIG. 10 shows us as altering the table, we can assume that the table is real and not virtual—i.e. it is defined in the DB2 catalog as having a type-2 clustering index and using ICP. Note: This demonstration is equally applicable for an unrealized table that has been created and persists only as a virtual object in an RC/Migrator strategy; where, the index is likewise also virtual and is created in the same RC/Migrator strategy.

Since this table is complete and is using ICP, altering its clustering index can be either benign or have certain ramifications, causing irreversible implicit changes to the table, depending on the kinds of changes that are made to the index. This invention detects these changes, verifies that there are no conflicting options or specifications in defining the index or the changes that are to be made, notifies the user as to what implicit changes will be made, if any, and specifically what kind of index will, or can be, created based on information gathered about the table object and its index definitions and the changes that are specified for the index.

For the purpose of this demonstration, we will attempt to first alter the table object's type-2 partitioned clustering index to a type-D (Data-partitioning secondary) index, also referred to as a DPSI, and then to a type-P (Partitioning) index via the Index Type option on the Index Alter screen.

Referring to FIG. 11, without touching any other fields, we have overtyped the '2' in the Index Type field with 'd' so as to indicate that we want to change the index from a type-2 partitioned clustering index into a DPSI (type-D) index. After pressing the Enter key, we receive an error, as shown in FIG. 12, notifying us that 'D' is not permissible. This is because this invention looked at everything that may influence whether we can successfully make the requested alteration by not only looking back at current attributes, but by also looking ahead to make sure that these alterations are compatible with real objects with no alterations, real objects with unrealized alterations not yet solidified in the DB2 catalog, virtual objects that may not yet exist and only exist as definitions in, for example, an RC/Migrator strategy, and whether the alterations make sense or can be accomplished at all using only ALTER INDEX statements.

The description of the RO800E message provides more information for the user:

RO800E is an error message indicating that because the index's table object is defined to use index-controlled partitioning and because the index you are altering is the table's partitioned clustering index, the only valid values that are allowed for Index Type are 2 and P. The reasons are described in more detail below.

Specifically, by altering the table's partitioned clustering index so that it is no longer a type-2 index will cause the table to be implicitly converted to use table-controlled partitioning instead of index-controlled partitioning. This can only be done on an ALTER INDEX by changing the definition of the clustering index to NOT CLUSTER or by outright dropping the clustering index.

The first method will cause the clustering index to be implicitly converted into a Partitioning (type-P) non-clustering index with a key that matches the converted table's partitioning key. The second method will cause the table to be converted the same as will the first method, but with no index afterwards. Both methods will cause the table's partitioning key to match the key of the clustering index—because the partitioning key is always unconditionally and unavoidably derived from the table's clustering index's key.

Given these only two available methods, and because the partitioning key of the converted table will always match the key of the clustering index, and because the key of a DPSI cannot be a matching or superset of the table's partitioning key, it is not possible to make such an alteration to a single object where the object before and after the conversion to table-controlled partitioning simultaneously has two distinctly different keys—one for the partitioning table and another, which must not be a matching or superset of the table's partitioning key, for the index.

If a user wishes to convert the table to use table-controlled partitioning instead of index-controlled partitioning while at the same time replacing the table's clustering index with a Data-partitioned secondary index (DPSI,) the user must do so by first explicitly dropping the clustering index and then separately creating a new partitioned index for the table with a key that is not a matching or superset of the table's partitioning key that was derived from its clustering index's key.

Basically, what is being said here is that, try as you might, you simply cannot get there from here—it is impossible. So, what this invention also does is detect and notify the user when impossible changes are attempted; and further educates the user, through alerts, messages and accompanying documentation as to why; and then how the same may be accomplished using workable methods and approaches. Important: Even though this constraint is imposed in the current implementation, this invention also claims to be able to provide an option to the user, through pop-up windows, commands, option settings, and the like, so that the user may specify whether the table is to be converted to TCP using the clustering index's OLD key definition, including the columns that compose the key, their arrangement, ascending/descending order, ending values, and so forth; or, if NEW changes specified on the Index Alter screen are to be applied prior to the table's conversion to TCP so that the table's partitioning key uses the index's newly altered key column definition as compared to its original OLD definition for the table's partitioning key.

By allowing the user to optionally specify that the OLD key definition is to be used for when the table is converted to use TCP, instead of using the new changes made to the clustering index's key, the NEW key may be isolated and used for when the index is re-created so as to allow the index to be re-created as a DPSI (type-D) or a Partitioning (type-P) index, depending on whether the index's NEW key is a subset, a matching or superset of the newly converted table's partitioning key.

By providing this additional feature, that which is described in the last paragraph of the description of the RO800E message (above) may be facilitated by providing complete automation for the described procedure and having all necessary DDL automatically generated for the user so as to allow the user to make such changes via a single object screen, instead of having to make multiple changes to multiple objects using multiple object screens in order to accomplish and achieve the exact same end result.

Next, referring to FIG. 13, without touching any other fields, we have overtyped the '2' in the Index Type field (or the invalid 'd' from the previous demonstration,) with 'p' so as to indicate that we want to change the index from a type-2 partitioned clustering index into a Partitioning (type-P) clustering index. After the Enter key is pressed, the change is accepted (FIG. 14), the "PS" column in the screen's key column now shows the Partitioning (key) Sequence number for each key column that will be a member of the table's partitioning key when the table is converted to use TCP:

The "PS" column shows the Partitioning Sequence of the column in the table's partitioning key when the table object for the index is (or will be) using table-controlled partitioning. If the column is not part of a partitioning key or if the table is not using table-controlled partitioning, no value displays.

"PS" is useful in quickly determining whether or not the key for the index is a matching or superset of the table object's partitioning key. These sequence numbers will always match the SEQ# column because when the index being altered is the clustering index for a partitioned table and the table is not currently using TCP, then the index's key will inherently match the table's partitioning key after its conversion to use TCP via an ALTER to NOT CLUSTER. (Also see optional exception in Notes below.)

Since we left the Cluster option set to YES, it seems that there is a conflict with that which was described for FIG. 12 as one of the only two methods of converting the table to use TCP instead of ICP via the clustering index—by altering the index to NOT CLUSTER or by dropping the index. Since we are not performing any drops and are merely making an alteration, it leaves us with the former option of just altering the index to NOT CLUSTER using an ALTER statement.

This invention, however, also recognizes and takes advantage of the fact that an index may be altered to NOT CLUSTER and then altered back to CLUSTER using two INDEX ALTER statements. So, this combination (screen option Cluster=YES and Index Type=P) is allowed and the appropriate DDL statements that are necessary to accomplish this is automatically generated for the user, as illustrated in FIG. 3. Notes: Although FIG. 14 does not show an alert to the user that the requested change will cause the table to be converted to use TCP instead of ICP, this invention formats such an alert—directly on the screen, within generated DDL, or both, as is such with all alerts or messages.

Along the lines of that which was described for FIG. 12, this invention also provides an option to the user, through pop-up windows, commands, option settings, and the like, so that the user may specify whether the table is to be converted to TCP using the clustering index's OLD key definition, including the columns that compose the key, their arrangement, ascending/descending order, ending values, and so forth; or, if NEW changes specified on the Index Alter screen are to be applied prior to the table's conversion to TCP so that the table's partitioning key uses the index's newly altered key column definition as compared to its original OLD definition for the table's partitioning key. By allowing the user to optionally specify that the OLD key definition is to be used for when the table is converted to use TCP, instead of using the new changes made to the clustering index's key, the NEW key may be isolated and used for when the index is re-created so as to allow the index to be re-created as Partitioning (type-P) index having a key that is a superset of the newly converted table's partitioning key.

For the purpose of this demonstration, we shall create a second partitioned index on a table that is using ICP (FIG. 15) by simply templating its current clustering index and changing the name of the index so that it is unique. We touch no fields other than the Index Name field.

When the Enter key is pressed, we receive an alert notifying us that the Index Type has been changed to 'P' and that the key is a matching or superset of the clustering index key. Notice also that the Cluster option has also been changed to NO, because the table already has a clustering index (i.e. the index that we are templating) and only one clustering index is allowed on a table. The description of message RO376I explains further:

RO376I is an informational message indicating that Index Type for your partitioned index has been automatically altered to 'P' because the key for the index is a matching or superset of the table object's clustering index's key.

If the Cluster option was YES, it has also been changed to NO because the table already has a clustering index and DB2 allows only one clustering index for a table.

Note: If you continue with these changes and execute the generated DDL, the table object will be implicitly converted to use table-controlled partitioning by DB2.

What if we were to override the Cluster option with YES (FIG. 17)—trying to undo that which was decided as necessary in order to successfully create a type-P index for the table?

As is shown here in FIG. 18, the Cluster option is returned to its previous setting, as is explained by the description of the alert (message RO440I) that is issued to the user:

RO440I is an informational message indicating that the Cluster option has been automatically altered to NO for you because the table object for the index already has a clustering index defined and DB2 allows only one clustering index for a table. No further action is required on the user's part.

This further demonstrates that even if the user insists on entering invalid or incompatible settings for the type of index to be created, or if there are other objects (virtual or real) of certain types with definitions that will conflict with the object being created or altered, the user is prevented from intentionally or inadvertently making such mistakes so as to further guarantee that the DDL that is generated will successfully execute and will not conflict with other objects, their definitions or cause SQL errors. Now, referring to FIG. 19 let's try deleting one of the key columns on this index to see what happens.

After pressing the Enter key, the table object, and all indexes on the table, are again interrogated; the Index Type is automatically altered to 'D' and we receive another alert (FIG. 20) with the following description:

RO375I is an informational message indicating that Index Type for your partitioned index has been automatically altered to 'D' because the key for the index is not a matching or superset of the table object's clustering index's key. As a convenience, Unique Rule was also changed to NO for you if it was previously UNN or YES so that it is compatible with the changed Index Type.

Note: If you continue with these changes and execute the generated DDL, the table object will be implicitly converted to use table-controlled partitioning by DB2. No matter what we do, we cannot get into trouble. If a type-D index, for example, is not what we wanted, then we now have an opportunity to make additional changes in order to correct the situation before even generating DDL; or, worse yet, executing the DDL and finding out after it is too late that we did not get what we thought we were going to get.

The possibility of getting a type-P instead of a type-D or visa versa, is quite real considering that there is no way to explicitly specify the intended type of index that you want to create on the DDL statement (as was mentioned earlier under FIG. 4,) and one minor miscalculation can yield the implicit creation of the wrong index type (if done manually, for example,) as is illustrated in the next two figures that show both create statements—the first for our type-P index and the second for our type-D index.

To the indiscriminate eye, both statements (FIG. 21 and FIG. 22) look pretty much identical; however, the difference between the two is simply that the first CREATE statement specifies 3 columns (COL1, COL2 and COL3) for the index's key, and the second CREATE statement specifies only 2 columns (COL1 and COL2.) Most importantly, without first scrutinizing the table and its clustering index, there is absolutely no way to determine, by just looking at these statements, whether the first and second statements will both cause type-P indexes to be created, type-D indexes to be created or a combination of the two. And, when virtual objects are present, or when virtual changes are outstanding and not yet applied to the real objects, such as in an RC/Migrator strategy that can involve thousands or tens-of-thousands of objects, the confusion only mounts.

This invention eliminates any kind of confusion in this area so you know well in advance exactly what kinds of indexes will be created, regardless of how vague the DDL may be, and what impact the creation of the indexes will have on their table objects—even before the DDL is generated.

Referring to FIG. 23, we have a partitioned table with five columns. The table is using table-controlled partitioning. Its partitioning key is composed of the columns COL1, COL2 and COL3, respectively, as is indicated by the sequence numbers beside each column under the "PS" heading in the list. Since FIG. 23 shows us as altering the table, we can assume that the table is real and not virtual—i.e. it is defined in the DB2 catalog, with or without any index(s) defined, and using TCP.

Note: This demonstration is equally applicable for an unrealized table that has been created and persists only as a virtual object in an RC/Migrator strategy; where, any indexes created are likewise virtual and are also created in the same RC/Migrator strategy.

Since this table is complete and is using TCP, creating a partitioned index is benign in the sense that there is no implicit changes that will be applied to the table as was described under earlier subsections. However, the type of index that is created is still implicit, as was described in earlier subsections; and, there is still no way to explicitly specify the intended type of index that is wanted on the DDL statement.

This invention, after gathering all of the information requisite about the TCP table on which the partitioned index is being created, assists the user in determining the exact kind of index that will be implicitly created and presents alerts and indicators on the screens to assist the user in facilitating this determination; also, providing the user advanced means of making further changes so as to guarantee that the index that will be created is of the correct type that is wanted and thus ensuring the performance and behaviors that that kind of index will provide to the table object's data rows according to the design intended by a Data Base Administrator.

For the purpose of this demonstration, we will start by creating a type-P index followed by a type-D index—showing the different behaviors of the screens for both types; and, how the end-user is assisted and notified each step of the way so as to guarantee that the user knows in advance exactly what kind of index is going to be created before generating DDL or executing the generated DDL.

Note: Although there are similarities with that which was described earlier under subsection "Creating a Second Partitioned Index on Table that is using ICP," this subsection describes the creating of partitioned indexes on a table that is already using TCP; and, so the behaviors and alerts here are different than those when creating an index on a table that is using ICP.

Referring to FIG. 24, we have taken the liberty of filling in all of the required fields for creating our index, including the Index Name and Creator, Table Name and Creator, and so forth; and, since this is going to be a partitioned index, the Partitioned option is set to YES; and, the index space partitions for the index are defined in the second list at the bottom of the screen, with a number of partitions matching the number shown in the table's tablespace (in the TS Parts field to the immediate right of the Partitioned option.) Important: Index Type is irrelevant at this point because there are no key columns defined; and, since this invention takes care of the proper setting for this option, based on the columns chosen for the index's key, as will be demonstrated in following figures, we may safely leave it set to its default value '2.'

We then enter the KEY command (FIG. 24) so that we may define key columns for the index (this is not normally necessary, because the invention will automatically display the screen in FIG. 25 for you, knowing already that key columns for the index must be defined anyway; however, for this demonstration, the screens are being presented manually so we can better see what is happening, step-by-step.)

After entering the KEY command (FIG. 24) and pressing the Enter key, the "Index Column Selection & Key Maintenance" screen displays (FIG. 25.) On this screen, all columns that are defined for the table, on which the index is being created and that are eligible for selection for the index's key, are displayed.

This invention automatically identifies which table columns are members of the table's partitioning key under the "PS" heading in Column Name Selection list. "PS" is the Partitioning (key) Sequence of the column in the table's partitioning key when the table object for the index is using table-controlled partitioning. If the column is not part of a partitioning, no value displays. If the table is not using table-controlled partitioning, no value displays for any columns in either this list or the Index Key list. Important: The display of the table's partitioning key sequence numbers provides the user with very useful information so that it may be determined, in advance, which table columns, and which ordering of the same, will yield a type-P or a type-D index.

"PS" also shows in the Index Key list (FIG. 28 and FIG. 30) and is useful in quickly determining whether or not the key for the index is a matching or superset of the table object's partitioning key. Since we want to create a type-P index, DB2 requires that the key that we create for our index is a matching or superset of the table's partitioning key. So, we simply select all three columns that show partitioning sequence numbers under the "PS" heading (FIG. 26.)

After pressing the Enter key, the columns are automatically selected for us and are moved to the Index Key list at the bottom of the screen (FIG. 27) Each of the selected columns is added to our index's key in sequential (COL#) order.

Since the partitioning sequence numbers of the columns were in the same order as the table's columns, no re-arranging is necessary. Notice that the key column sequence numbers (under the SEQ# heading in the second list) and the partitioning sequence numbers (under the PS heading in the same list) are side-by-side and match; and, there are no columns left behind in the first list with partitioning sequence numbers. This shows that we successfully selected all of the table's partitioning key columns for our index's key and that they match, exactly, the table's partitioning key.

At this point, we are done, and we can enter the END command so that we may be returned to the previous (Index Create) screen. After entering the END command and pressing the Enter key (FIG. 27) we return to the Index Create screen (FIG. 28) at which time the Index Type is automatically changed for us and we are alerted with the RO379I message, whose description is as follows:

RO379I is an informational message indicating that Index Type for your partitioned index has been automatically altered to 'P' because the key for the index is a matching or superset of the table object's partitioning key. No further action is required on your part.

Now, lets quickly back up and try selecting the columns for our index again, still selecting columns that are members of the table's partitioning key; but instead, such that the key for the index will not be a matching or superset of the table's partitioning key so that what is yielded is an index that is implicitly created as a type-D (DPSI) rather than a type-P (FIG. 29.)

After selecting the second and third columns of the table's partitioning key (FIG. 29) we will presume to have also entered the END command and pressed the Enter key. After entering the END command and pressing the Enter key (FIG. 29) we return to the Index Create screen (FIG. 30) at which time the Index Type is automatically changed for us and we are alerted with the RO378I message, whose description is as follows:

RO378I is an informational message indicating that Index Type for your partitioned index has been automatically altered to 'D' because the key for the index is not a matching or superset of the table object's partitioning key. As a convenience, Unique Rule was also changed to NO for you if it was previously UNN or YES so that it is compatible with the changed Index Type. No further action is required on your part.

As was also described under subsection, "Creating a Second Partitioned Index on Table that is using ICP," no matter what we do, we cannot get into trouble. If a type-D index, for example, is not what we wanted, then we now have an opportunity to make additional changes in order to correct the situation before having DDL generated; or, worse yet, executing the DDL and finding out after it is too late that we did not get what we thought we were going to get.

The same here also applies to that which was described under subsection "Creating a Second Partitioned Index on Table that is using ICP," concerning the generation of DDL—in that the type of index is determined implicitly by DB2 and there is no method provided for explicitly declaring the type of partitioned index to be created; only, implicitly via the columns enumerated in the definition of the index's key (FIG. 29 and FIG. 30.)

Validation and Notification Processing Claims, Itemized by Diagnostics Issued

RO064E Invalid Index Type option. Valid values: 2, D and P.

Verify that Index Type is 2 (type 2 index,) D (Data-Partitioned Secondary Index (DPSI),) or P (Partitioning Index.)

RO190I Index Type changed to 2 because index is defined as not partitioned.

Notify if Index Type needed to be automatically altered to type 2 because index being creating or altered is defined as not partitioned.

When the Partitioned option is NO, indicating that the index is not to be a partitioning index, the Index Type must be 2. Any other value entered for Index Type is ignored and the field automatically reset to 2.

RO191I Index Type updated due to current tablespace attributes.

Notify if Index Type option needed to be automatically altered to 2 so as to be compatible with the attributes of the table's tablespace and the index's Partitioned option. The value of Index Type is determined, in part, by the attributes of the tablespace containing the table on which you are creating or altering the index. When the tablespace is not partitioned and the index's Partitioned option is also set to NO, the Index Type must be 2 and any value keyed into this field is automatically reset to 2.

Note: Setting the index's Partitioned option to YES causes the tablespace's actual partitioning attributes to be ignored and the DDL for your index will be generated as though the tablespace were partitioned. Although this is allowed, you may receive SQL errors if the generated DDL is executed on the current DB2 subsystem.

RO192I Index attributes have been updated to be compatible with type of index.

Notify if index as been automatically updated so as to be compatible with the Type of index being created or altered, as specified/indicated by the Index Type option on the Index Alter, Create or Template screen. The following table shows the affected attributes that pertain to this message and the values to which they are automatically set based on partitioning and index type.

| Table Partitioning | Index Parted | Type | → | Cluster* | Unique Rule |
|---|---|---|---|---|---|
| n/a | NO | 2 | --> | n/a | n/a |
| Not TCP | YES | 2 | --> | YES | n/a |
| TCP | YES | D | --> | n/a | NO |
| Not TCP | YES | P | --> | NO(1) | n/a |

Notes:
n/a Indicates that the attribute is of no consequence or not impacted.

(1) On a CREATE, when the table object is not using TCP and no clustering index is defined (i.e. table has no limit values,) value YES is not allowed because DB2 cannot create a clustering partitioning index until limit values are defined for the table; however, DB2 can create a non-clustering partitioning index if limit values are also included so that DB2 can implicitly convert the table object to use TCP. For this to happen, Cluster must be NO. (Also see Tip below concerning ALTERs).

\* If table object already has a clustering index defined, message RO440 may be issued instead.

Tip: If you want to generate ALTER INDEX statements for a partitioned clustering index that will convert the partitioned table to use table-controlled partitioning instead of index-controlled partitioning using the method of altering CLUSTER to NOT CLUSTER and then back to CLUSTER, simply change the Index Type on the Index Alter screen to P. The Cluster option will remain set to YES for you. (You may optionally set Cluster to NO if you do not want the index changed back to a clustering index.) This behavior is available on an Alter, only.

RO193I Unique Rule updated due to current table object attributes.

Notify if Unique Rule has been automatically altered to NO for so as to be compatible with the current attributes of the index's table object.

This value was determined by the current attributes of the table object that is being indexed. For Materialized Query Tables (MQTs) the Unique Rule must be NO.

No further action is required on your part.

RO194W The table object identified cannot be found in the current subsystem.

Verify and warn if the table object specified for the index cannot be found in the current subsystem. If a user wants to create or alter an index for an existing table object, require that both a valid table name and table creator be entered. IMPORTANT: Some validation processing for conflicting or allowable options is performed based on available information about the table and tablespace. When the table object or its tablespace does not exist or cannot be found, some validation processing may not be performed and user will be allowed to specify options that may either conflict or be inapplicable to the table object for which the DDL is generated.

User may ignore this warning; however, doing so may produce SQL errors if the generated DDL is executed on the current DB2 subsystem.

RO221E The LIMITS command is not allowed on a non-partitioned index.

Verify that the LIMITS primary command is entered for a partitioned index, only.

The LIMITS command is used for setting limit key values for partitioned indexes and is not valid for non-partitioned indexes.

If user is creating a partitioned index and wants to specify limit key values for the partitions, user must first specify that the index is partitioned by setting the Partitioned field in the top portion of the screen to YES prior to issuing the LIMITS command.

Note: The LIMITS command is not allowed for indexes on table objects using TCP (table-controlled partitioning) or indexes whose table object already has limits defined through another index.

RO245I Index Type updated for current version of DB2.

Notify if user, although may have entered a recognizable Index Type, it is not valid for the version of DB2 as required by the product being used, so it has been automatically changed to '2' for user so it will be compatible with the user's DB2 as explained below.

The Index Type must be '2' on DB2 versions less than 8. Any other value entered into this field is ignored and the field automatically reset to 2.

If user is altering or templating an old type-I index that was created prior to DB2 V6, or if user explicitly enter '1' for Index Type, it is automatically changed to 2 on the screen for because 1 is no longer supported by the product or allowed on the user's DB2.

If this informational message appears every time user tries to create an index, user may need to update his/her Object Definition Defaults to reflect their DB2 version. Make sure that Object Attribute TYPE for Object Type INDEX is set to 2 in Object Definition Defaults for userid.

For additional information on Object Definition Defaults, refer to the DEFAULTS primary command.

RO319E Enter limit key values to continue "end-processing." Cancel to return.

Verify that that there are no required limit key values that have been omitted. This error is issued when pressed END is entered, or an attempt has been made to save changes or generate DDL, and no limit key values are specified for the index.

Before "end-processing" can continue, user is required to specify, at minimum, a limit value for the first key column of each partition defined in the index.

If user does not want to enter limit values at this time, user can press CANCEL to return to the Table or Index Create/Alter screen so user can continue altering or creating the index.

RO374E Invalid Index Type option for table. Permissible values: 2 and P.

Verify and impose restriction if necessary, to with, because of the underlying attributes of the index's table object, the only valid values that are allowed for Index Type are 2 and P. The reasons are described in more detail below.

Specifically, the table object is defined in a partitioned tablespace, is not using table-controlled partitioning and does not yet have a clustering index defined, meaning that the table does not have any limit keys defined either. When creating a partitioned index for such a table object, limit values must also be defined, and so the only two types of partitioned indexes that may be created is either a type-2 clustering index or a type-P (partitioning) non-clustering index, both requiring limit values.

Create a type 2 clustering index, which will cause the table to use index-controlled partitioning.

P Create a non-clustering partitioning index, which will cause the table object to be implicitly converted to use table-controlled partitioning by DB2 when the generated DDL is executed.

One of the above values for Index Type is require. This error must be corrected before processing can continue.

RO375I Index Type changed to D: key not a matching or superset of clustering index key.

Notify if Index Type for the partitioned index has been automatically altered to 'D' because the key for the index is not a matching or superset of the table object's clustering index's key. As a convenience, Unique Rule is also changed to NO (Not Unique) if it was previously UNN (Unique Not Null) or YES (Unique) so that it is compatible with the changed Index Type.

Alert: If user continues with these changes and execute the generated DDL, the table object will be implicitly converted to use table-controlled partitioning by DB2. (This check and subsequent message also serves as an alert to the user as to this implication.)

RO376I Index Type changed to P: key is a matching or superset of clustering index key.

Notify if Index Type for partitioned index has been automatically altered to 'P' because the key for the index is a matching or superset of the table object's clustering index's key.

If the Cluster option was YES, it has also been changed to NO because the table already has a clustering index and DB2 allows only one clustering index for a table.

Alert: If user continues with these changes and execute the generated DDL, the table object will be implicitly converted to use table-controlled partitioning by DB2. (This check and subsequent message also serves as an alert to the user as to this implication.)

RO377I Index Type changed to P: non-TCP table with no limit values already has a non-partitioned clustering index.

Notify if Index Type for partitioned index has been automatically altered to 'P' because the table object does not use table-controlled partitioning, does not have limit values defined and already has a non-partitioning type-2 clustering index defined.

Given the above, a non-clustering partitioning index is the only type of partitioned index that can be successfully created for the table object, which requires the Index Type must be 'P'. Cluster is also changed to NO if it was previously YES.

Because no limit values are defined for the table, limit values are required and must also be defined for this index.

Alert: If user continues with these changes and execute the generated DDL, the table object will be implicitly converted to use table-controlled partitioning by DB2. (This check and subsequent message also serves as an alert to the user as to this implication.)

RO378I Index Type changed to D: key not a matching or superset of table's partitioning key.

Notify if Index Type for partitioned index has been automatically altered to 'D' because the key for the index is not a matching or superset of the table object's partitioning key. As a convenience, Unique Rule is also changed to NO (Not Unique) for user if it was previously UNN (Unique Not Null) or YES (Unique) so that it is compatible with the changed Index Type.

No further action is required on user's part.

RO379I Index Type changed to P: key is a matching or superset of table's partitioning key.

Notify if Index Type for partitioned index has been automatically altered to 'P' because the key for the index is a matching or superset of the table object's partitioning key.

No further action is required on user's part.

RO440I Cluster changed to NO because table already has a clustering index.

Notify if Cluster option has been automatically altered to NO for because the table object for the index already has a clustering index defined and DB2 allows only one clustering index for a table.

No further action is required on user's part.

RO441E The &V1 command is not allowed for indexes on table objects using TCP.

Verify that user did not enter either an L (Limits) line command beside a partition or the Limits primary command for a partitioned index using table-controlled partitioning. Neither command is allowed when the table object is using table-controlled partitioning because such a table object already has limits defined for it through TCP.

RO442E The &V1 command is not allowed because the table object already has limits defined through another index.

Verify that user did not enter either an L (Limits) line command beside a partition or the Limits primary command for a partitioned index using index-controlled partitioning that has limits defined through another index. Neither command is allowed when the table object is using index-controlled partitioning and already has limits defined for it through another index that is a clustering index.

RO443E The &V1 command is not allowed for a DPSI.

Verify that user did not enter either an L (Limits) line command beside a partition or the Limits primary command for a partitioned index defined as a Data partitioned Secondary Index (DPSI.) Neither command is allowed when the index is defined as a Data Partitioned Secondary Index (DPSI) since limit values cannot be defined for a DPSI because DPSIs do not support limit values.

RO748E Invalid TYPE option. Valid values are 2, D, P and blanks.

Verify that a valid value for Index Type option. The Index Type option specifies the type of index and influences the behavior of Index Create and Alter screens, assists in validation processing in determining the values that may be specified for certain other index attributes and how or what DDL clauses are to be generated. Valid values for this option are:

Type 2 index

D Data-Partitioned Secondary Index (DPSI)

P Partitioning Index spaces Specifies that there is no default defined for this option. On the Index Create screen, the initial default 2 is used.

This error must be corrected by entering one of the above values for this option. A valid value must be entered before processing can proceed.

RO800E Invalid Index Type option for table. Permissible values: 2 and P.

The description of the RO800E message provides more information for the user:

RO800E is an error message indicating that because the index's table object is defined to use index-controlled partitioning and because the index you are altering is the table's partitioned clustering index, the only valid values that are allowed for Index Type are 2 and P. The reasons are described in more detail below.

Specifically, by altering the table's partitioned clustering index so that it is no longer a type-2 index will cause the table to be implicitly converted to use table-controlled partitioning instead of index-controlled partitioning. This can only be done on an ALTER INDEX by changing the definition of the clustering index to NOT CLUSTER or by outright dropping the clustering index.

The first method will cause the clustering index to be implicitly converted into a Partitioning (type-P) non-clustering index with a key that matches the converted table's partitioning key. The second method will cause the table to be converted the same as will the first method, but with no index afterwards. Both methods will cause the table's partitioning key to match the key of the clustering index—because the partitioning key is always unconditionally and unavoidably derived from the table's clustering index's key.

Given these only two available methods, and because the partitioning key of the converted table will always match the key of the clustering index, and because the key of a DPSI cannot be a matching or superset of the table's partitioning key, it is not possible to make such an alteration to a single object where the object before and after the conversion to table-controlled partitioning simultaneously has two distinctly different keys—one for the partitioning table and another, which must not be a matching or superset of the table's partitioning key, for the index.

If you want to convert the table to use table-controlled partitioning instead of index-controlled partitioning while at the same time replacing the table's clustering index with a Data-partitioned secondary index (DPSI,) you must do so by first explicitly dropping the clustering index and then separately creating a new partitioned index for the table with a key that is not a matching or superset of the table's partitioning key that was derived from its clustering index's key.

Figure 31:
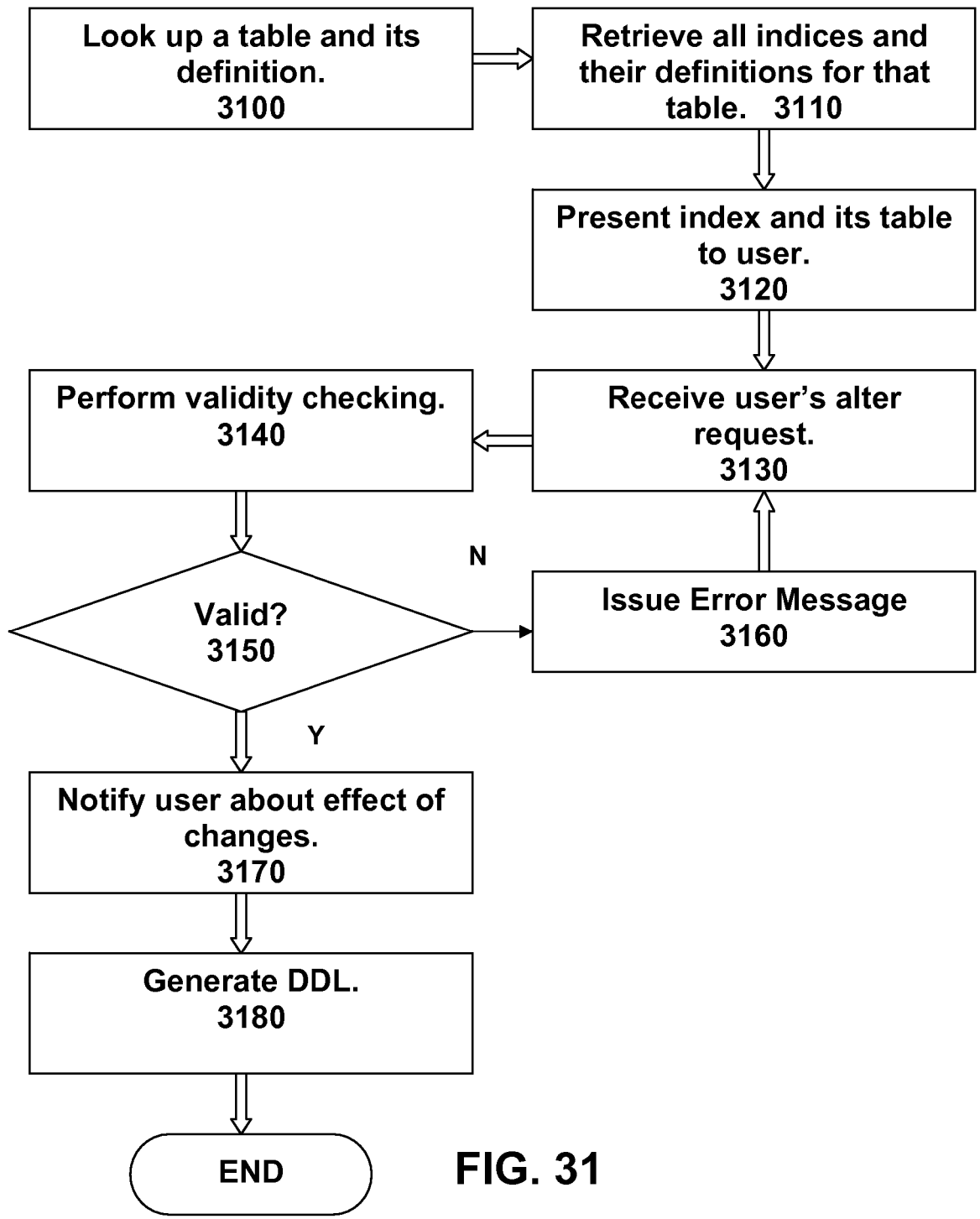
FIG. 31 is a flow chart of a method for creating and managing partitioned table indices, according to an embodiment of the present invention.

Without this invention, it is not otherwise possible to conveniently create or alter an index, from a single set of index object create and alter screens, that provide all the necessary information and safeguards to safely create, alter and manage partitioned indexes (real or virtual) on real or virtual tables. The general architecture and concept of this invention is not specific to any computer language or hardware architectural platform. With the above examples serving to graphically illustrate how the method facilitates the creating and altering of partitioned indices, we refer now to the high level flow chart of FIG. 31. In step 3100, we first need to look up a table and its definition. Next, in step 3110 we retrieve all indices defined for that table and their corresponding definitions. This can be done for both a real and virtual table and for both real and virtual indices. Set up assumptions are that we reference a database that handles partitioned indices, such as DB2; and that we use a graphical user interface such as pop-up windows or the like wherein a user can easily input data.

In step 3120 we present a graphical representation of the index and its table (or a portion of the table) to the user. The graphical representation will display some information about the table, display at least some of the table columns and provide an input box or the like for a user to enter data to create or alter the index on the table.

In step 3130, we receive the user's alter request in the form of a command (such as INDEX ALTER). In the alternative, the user's request may be received in the form of a user's acceptance of a pre-set default field, such as be pressing an ENTER icon.

Next, in step 3140 we perform validity checking on the screen option selected by the user. If the option selected is invalid for the index type and table as determined in step 3150, we issue an error message in step 3160. In the alternative, we override the screen option selected to one that is valid and issue a diagnostic message. The user can enter another screen option.

If the screen option is valid, in step 3170 we issue an informational message to the user notifying the user as to what implicit changes will be made based on the selected screen option. In addition, we also alert the user as to what impact any explicit changes will have. Note that validity checking step is performed for each screen option entered by the user. Once the user has finished configuring the virtual table, in step 3180 we generate the requisite data definition language statements to solidify the changes.

Figure 32:
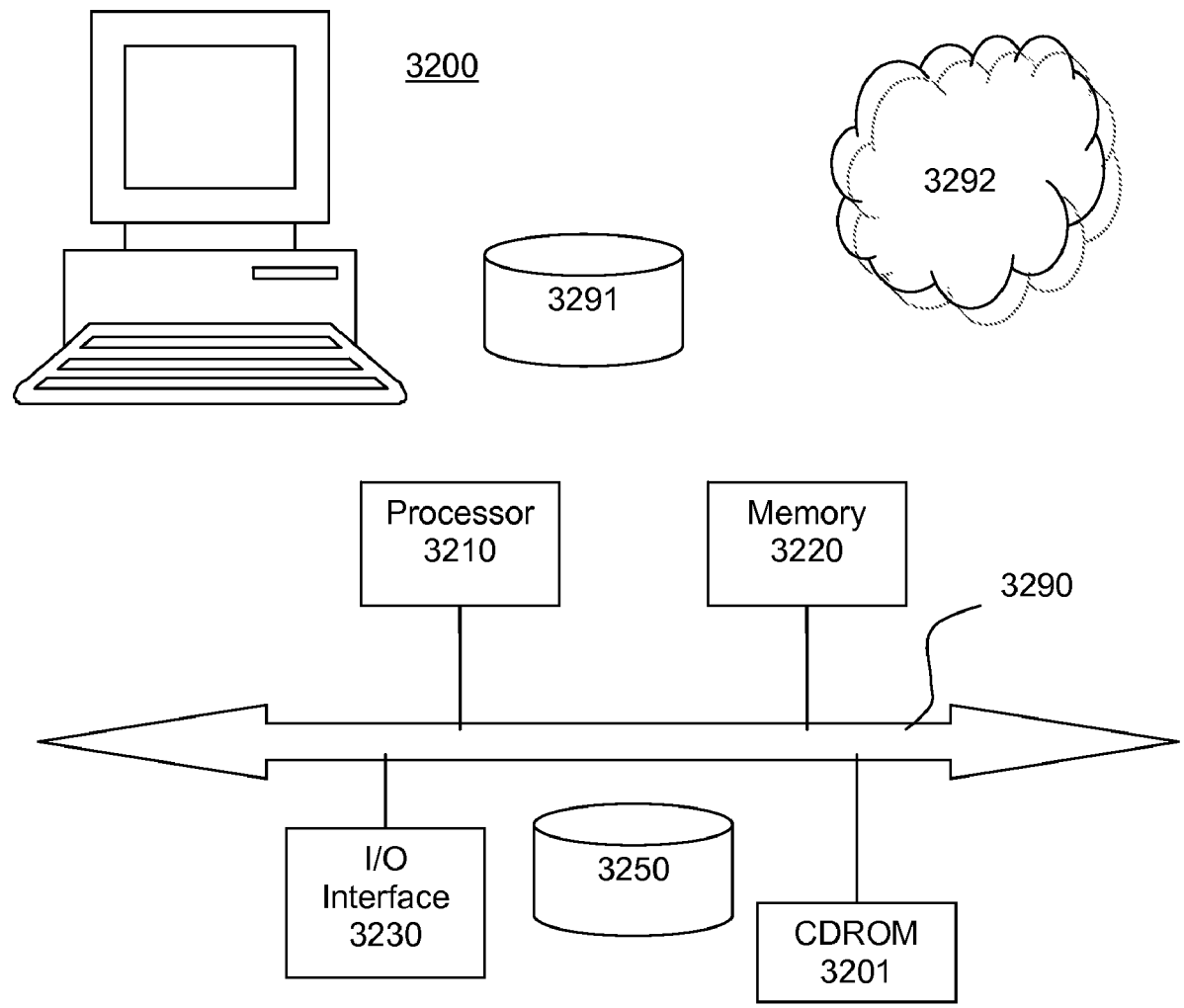
FIG. 32 is a simplified diagram of a system configured to operate according to an embodiment of the present invention.

Referring to FIG. 32 there is shown a highly-simplified illustration of an information processing system 3200 configured to operate according to an embodiment of the present invention. For purposes of this invention, computer system 3200 may represent any type of computer, information processing system or other programmable electronic device, including a client computer, a server computer, a portable computer, an embedded controller, a personal digital assistant, and so on. The computer system 3200 may be a stand-alone device or networked into a larger system. The computer system may be a networked system including devices with graphical user interfaces configured with database software, a database 3291 or other file storage device, a firewall, and a proxy server. The computer system may encompass an internet location on the Internet 3292. The interactions between a user of the system 3200 and the system 3200 may occur via a web interface. In such a case, it becomes necessary to use a proxy server and/or firewall. It will be understood by those with knowledge in the art that the system 3200 is not limited to any one embodiment described and illustrated herein, but rather may encompass many permutations of hardware, software, and/or firmware.

The system 3200 includes a number of components, such as a processor 3210 operatively connected with a memory 3220, and an input/output (I/O) subsystem 3230. The system 3200 will also contain any number of operators and peripheral devices common to computing systems.

The processor 3210 may be a general or special purpose microprocessor operating under control of computer program instructions executed from memory 3220. The processor 3210 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in memory 3220 that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory 3220 may be partitioned or otherwise mapped to reflect the boundaries of the various memory subcomponents.

The memory 3220 represents either a random-access memory or mass storage. It can be volatile or non-volatile. The system 3200 can also comprise a magnetic media mass storage device such as a hard disk drive 3250.

The I/O subsystem 3230 may comprise various end user interfaces such as a display, a keyboard, and a mouse. The I/O subsystem 3230 may further comprise a connection to a network such as a local-area network (LAN) or wide-area network (WAN) such as the Internet. Processor 3210 and memory 3220 components are physically interconnected using conventional bus architecture 3290.

According to an embodiment of the invention, a computer readable medium, such as a CDROM 3201 can include program instructions for operating the programmable computer 3200 according to the invention. Note that the computer readable medium may be computer program code that is downloaded from the Internet 3292. What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of media actually used to carry out the distribution. Examples of media include ROMs, DVD-ROMs, and transmission-type media, such as digital and analog communication links, wired or wireless communications links using transmission forms, such as, for example, radio frequency and light wave transmissions. The media make take the form of coded formats that are decoded for use in a particular data processing system.

This invention may be easily adapted to hand-held or portable devices: Prompting is especially useful for small handheld devices, such as cell phones, which would otherwise require (non-intuitive) complex or multiple fields, screen displays, etc. Alternatively, the device can "walk" or "guide" the user through using friendly intuitive methods—prompting the user for appropriate responses or programmed to anticipate (learning the-end-user's habits and behaviors) the most commonly used keyword identifiers and defaulting as such by default so as to minimize the questioning and prompting. This can be done by auto-generating the data in the fields. This provides for a more user friendly and intuitive interface and a more pleasant experience for a user. Otherwise, a longer learning curve is required if the same were used with multiple other specialized fields and/or screens for each possible scenario or behavior that would be required for each keyword that may be entered in addition to ordinary data when one or multiple like or differing fields are simultaneously displayed or maintained in either the foreground or background.

When using less definitive means of entering data and commands where the user is more detached from the electronic or computing device, there is a further need for the user to be able to easily indicate and the computer or device to recognize obscurity or ambiguous entries that may have multiple meanings and to delineate and confirm, either though solicitation or for the user to indicate using more explicit means, whether data is to be interpreted as a function, command or simply as ordinary data.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

I claim:

1. A method for facilitating creation and managing of partitioned table indices of a table object of a first software partitioning type, wherein said table object and its indices are wholly under management of a database's system and administrative software, the method comprising steps of:
  automatically looking up, in a hard disk drive, a table and its software partitioning type definition;
  retrieving the table index and all indices defined for the table object, and their definitions;
  presenting to a user a visual representation of at least a portion of the table and the index in a single set of index alter and create screens for a virtual table;
  receiving from the user an alter request in the form of a screen option;
  performing validity checking on the screen option based on its index type for each screen option entered;
  alerting the user to a change in a type of index according to the type that will be implicitly created based on table columns selected for an index key;
  presenting to the user real-time feedback that informs said user how alteration or creation of an index object in the virtual table causes the table object to be implicitly converted into table-controlled partitioning (TCP) type, comprising presenting to the user what kinds of indices will be generated for the virtual table and what impact the creation of said indices will have on their table objects with partitioning type conversions applied;
  wherein the table object is not changed until conversions are applied;
  automatically changing screen options so that they are compatible with the type of index specified;
  when the screen option is not valid for the index type, automatically overriding the screen option to one that is compatible, and issuing a diagnostic message, comprising automatically updating at least one attribute for the index to be compatible with the index type to be created; and
  when the screen option is valid for the index type, notifying the user by issuing informational messages as to what implicit changes will be made to the table table, if any, and specifically what kind of index can be created based on information gathered about the table object and its index definitions and the changes that are specified for the index;
  wherein the informational messages comprise alerts, error messages, and diagnostic messages;
  alerting the user as to whether there will be an explicit irreversible conversion of the table object; and
  when the user has finished configuring the virtual table, applying the conversions by generating data definition language statements consistent with the screen options selected and accepted for the virtual table.

2. The method of claim 1 wherein issuing informational messages comprises alerting the user as to a change in the type of index according to the type that will be implicitly created based on the type of table and the table columns selected for the index's key.

3. The method of claim 1 wherein issuing information messages comprises alerting the user as to whether there will be an irreversible conversion of the table object from the first software partitioning type to Table Controlled Partitioning (TCP).

4. The method of claim 1 wherein issuing a diagnostic message comprises a help option providing more detailed information about the override.

5. The method of claim 1 wherein performing validity checking comprises:
inspecting both the type of index being created as well as the real or virtual definition of the table for which the index is being created;
inspecting current attributes; and
verifying that alterations specified by the alter request are compatible with real objects with no alterations, real objects with unrealized alterations not yet solidified, virtual objects that may not yet exist and only exist as definitions, and whether the alterations make sense or can be accomplished at all using only alter index statements and by dropping the index and recreating the index without implicitly causing, or explicitly necessitating, unwanted changes to the table object.

6. The method of claim 1 wherein presenting to the user comprises presenting an index alter screen comprising an automatically generated default value.

7. The method of claim 1 wherein virtual changes are stored in a remote data structure.

8. The method of claim 1 wherein the informational messages are issued directly on a screen.

9. The method of claim 8 wherein the informational messages are issued within the generated data definition language statements.

10. An information handling system for facilitating creation and managing of software partitioned table indices of a table object, the information handling system comprising:
a database comprising a table object of a first software partitioning type, the table object comprising a table index and all indices defined for said table object and their definitions;
a display configured for presenting a visual representation of at least a portion of the table index to a user of the database as a virtual table, wherein the visual representation comprises a single set of index alter and create screens;
an information storage device storing instructions to determine whether the table is a table controlled partitioning type, and for presenting a user real-time feedback that informs the user as to how alteration or creation of an index object in the virtual table causes the table object to be implicitly converted into table-controlled partitioning type, comprising presenting to the user what kinds of indices will be generated for the virtual table and what impact the creation of said indices will have on their table objects with partitioning type conversions applied;
wherein the table object is not changed until conversions are applied;
an input/output interface configured for prompting the user to enter an alter request and for receiving the alter request entered by the user, the alter request being entered as a screen option;
a processor configured for executing code that enables a computer to:
perform validity checking on the screen option based on the index type for each screen option entered;
alert the user to a change in a type of index according to the type that will be implicitly created based on table columns selected for an index key;
present to the user real-time feedback that informs said user how alteration or creation of an index object in the virtual table causes the table object to be implicitly converted into table-controlled partitioning (TCP) type, comprising presenting to the user what kinds of indices will be generated for the virtual table and what impact the creation of said indices will have on their table objects with partitioning type conversions applied;
wherein the table object is not changed until conversions are applied;
automatically change screen options so that they are compatible with the type of index specified;
when the screen option is not valid for the index type, automatically override the screen option to one that is compatible, comprising automatically updating at least one attribute for the index to be compatible with the index type selected, and issue a diagnostic message to the user;
when the screen option is valid for the index type, notify the user by issuing informational messages as to what implicit changes will be made to the table object, if any, and specifically what kind of index will, or can be, created based on information gathered about the table object and its index definitions and the changes that are specified for the index;
alert the user as to whether there will be an explicit irreversible conversion of the table object; and
when the user has finished configuring the virtual table, apply the conversions by generating data definition language statements consistent with the screen options selected and accepted for the virtual table.

11. The information handling system of claim 10 wherein the database uses DB2 software.

12. The information handling system of claim 10 wherein the input/output interface comprises pop-up windows.

13. The information handling system of claim 10 wherein the display and the input/output interface are embodied as web pages on the Internet.

14. The information handling system of claim 10 wherein the table object comprises a virtual table.

15. The information handling system of claim 10 further comprising a firewall operatively coupled with the database and the processor.

16. A computer program product embodied on a computer readable storage medium and comprising code that, when executed, causes a computer to:
automatically look up a table and its software partitioning type definition;
retrieve the table index and all indices defined for that table object, and their definitions;
present to a user at least a portion of the table index in a single set of index alter screens;
determine whether the table is of the TCP type or not, and present the user real-time feedback that informs the user as to how the alteration or creation of an index object on a table will cause the table to be implicitly converted into table-controlled partitioning type, wherein the table object is not changed until conversions are applied;
receive from the user an alter request in the form of a screen option;
perform validity checking on the screen option based on index type for each screen option entered;
alert the user to a change in a type of index according to the type that will be implicitly created based on table columns selected for an index key;
present to the user real-time feedback that informs said user how alteration or creation of an index object in the virtual table causes the table object to be implicitly converted into table-controlled partitioning (TCP) type, comprising presenting to the user what kinds of indices will be generated for the virtual table and what impact the creation of said indices will have on their table objects with partitioning type conversions applied;

wherein the table object is not changed until conversions are applied;

automatically change screen options so that they are compatible with the type of index specified;

when the screen option is not valid for the index type, automatically overriding the screen option to one that is compatible, and issuing a diagnostic message;

when the screen option is valid for the index type, notifying the user by issuing informational messages as to what implicit changes will be made, if any, and specifically what kind of index will, or can be, created based on information gathered about the table object and its index definitions and the changes that are specified for the index;

alert the user as to whether there will be an explicit irreversible conversion of the table object; and when the user has finished configuring the virtual table, apply the conversions by generating data definition language statements consistent with the screen options selected and accepted for the virtual table.

17. The computer program product of claim 16 wherein the code is able to be downloaded from the internet.

18. The method of claim 1 further comprising physically arranging the table object and its indices such that they all reside in one physical disk partition.

19. The method of claim 1 further comprising physically arranging each table object and its indices in individual separate physical disk partitions.

20. The method of claim 1 further comprising physically arranging the table object and its indices to span across multiple disk partitions.

* * * * *